US006378152B1

(12) United States Patent
Washburn et al.

(10) Patent No.: US 6,378,152 B1
(45) Date of Patent: Apr. 30, 2002

(54) MATTRESS STRUCTURE

(75) Inventors: Robyn P. Washburn, Batesville; Ryan A. Reeder, Brookville; Larry E. Luff, Batesville, all of IN (US); Ares Marasligiller, Villa Hills, KY (US); James R. Stolpmann, Charleston; Roger D. Dalton, Monks Corner, both of SC (US); Steven R. Westerfeld, Batesville, IN (US); Steven E. Weigold, Hamilton, OH (US)

(73) Assignee: Hill-Rom Services, Inc., Batesville, IN (US)

( * ) Notice: Subject to any disclaimer, the term of this patent is extended or adjusted under 35 U.S.C. 154(b) by 0 days.

(21) Appl. No.: 09/033,116

(22) Filed: Mar. 2, 1998

Related U.S. Application Data

(62) Division of application No. 08/565,409, filed on Nov. 30, 1995, now Pat. No. 5,815,865.

(51) Int. Cl.[7] ........................ A47C 27/10; A61G 7/015; A61G 7/018; H04Q 7/06

(52) U.S. Cl. ...................... 5/713; 5/710; 5/935; 318/16

(58) Field of Search ............................ 5/706, 710, 711, 5/712, 713, 714, 715, 722, 935; 318/16, 600, 601, 604

(56) References Cited

U.S. PATENT DOCUMENTS

| | | | |
|---|---|---|---|
| 595,734 | A | 12/1897 | Rand et al. |
| 1,323,610 | A | 12/1919 | Price |
| 2,245,909 | A | 6/1941 | Enfiajian |
| 2,651,788 | A | 9/1953 | Forwood |
| 3,080,578 | A | 3/1963 | Novascone |
| 3,080,720 | A | 3/1963 | Downs et al. |
| 3,138,807 | A | 6/1964 | Blecker |
| 3,574,873 | A | 4/1971 | Weinstein |
| 3,595,223 | A | 7/1971 | Castagna |
| 3,731,327 | A | 5/1973 | Frey |

(List continued on next page.)

FOREIGN PATENT DOCUMENTS

| | | |
|---|---|---|
| CH | 678-390 | 9/1991 |
| DE | 1114015 | 9/1961 |
| EP | 0 360 733 | 3/1990 |
| GB | 122806 | 2/1919 |
| WO | WO/81/02384 | 9/1981 |

OTHER PUBLICATIONS

"Introducing a revolutionary way to improve your sleep.", Select Comfort Corporation, advertising literature, 1996.
"Select Comfort Adjustable Firmness Sleep Systems", Select Comfort Corporation, advertising literature, date unknown.

*Primary Examiner*—Robert G. Santos
(74) *Attorney, Agent, or Firm*—Barnes & Thornburg

(57) ABSTRACT

A variable firmness mattress structure includes a plurality of longitudinally spaced apart, transversely extending air bladders and an air supply for filling each bladder to a respective desired air pressure to support a user at a desired mattress firmness. A control system for the variable firmness mattress structure includes at air controller cooperating with the air supply for filling the air bladders to desired air pressures and a hand-held controller in communication with the air controller. The hand-held controller is configured to receive a first input from the user indicating that a first desired mattress firmness currently exists and to transmit to the air controller a first signal corresponding to the first input. The first desired mattress firmness corresponds to a first set of respective desired air pressures in the bladders. The hand-held controller is further configured to receive a second input from the user indicating a desire to restore the first desired mattress firmness and to transmit to the air controller a second signal corresponding to the second input. The air controller responds to the second signal by restoring the first set of respective desired air pressures in the bladders.

19 Claims, 24 Drawing Sheets

U.S. PATENT DOCUMENTS

| | | | | | |
|---|---|---|---|---|---|
| 3,846,857 | A | | 11/1974 | Weinstock | |
| 3,848,282 | A | | 11/1974 | Viesturs | |
| 3,974,532 | A | * | 8/1976 | Ecchuya | |
| 4,070,719 | A | | 1/1978 | Morgan | |
| 4,180,877 | A | | 1/1980 | Higgins | |
| 4,306,322 | A | | 12/1981 | Young et al. | |
| 4,336,621 | A | | 6/1982 | Schwartz et al. | |
| 4,424,600 | A | | 1/1984 | Callaway | |
| 4,435,864 | A | | 3/1984 | Callaway | |
| 4,440,817 | A | * | 4/1984 | Ahlm | |
| 4,449,261 | A | | 5/1984 | Magnusson | |
| 4,524,473 | A | | 6/1985 | Fanti | |
| 4,580,301 | A | * | 4/1986 | Ludman et al. | |
| 4,622,706 | A | | 11/1986 | Takeuchi | |
| 4,628,557 | A | | 12/1986 | Murphy | |
| 4,634,179 | A | | 1/1987 | Hashimoto et al. | |
| 4,638,519 | A | | 1/1987 | Hess | |
| 4,694,520 | A | | 9/1987 | Paul et al. | |
| 4,706,313 | A | | 11/1987 | Murphy | |
| 4,745,647 | A | | 5/1988 | Goodwin | |
| 4,768,249 | A | | 9/1988 | Goodwin | |
| 4,803,744 | A | | 2/1989 | Peck et al. | |
| 4,829,615 | A | | 5/1989 | Raymond | |
| 4,829,616 | A | | 5/1989 | Walker | |
| 4,843,666 | A | | 7/1989 | Elesh et al. | |
| 4,862,538 | A | * | 9/1989 | Spann et al. | |
| 4,879,776 | A | | 11/1989 | Farley | |
| 4,890,344 | A | | 1/1990 | Walker | |
| 4,896,389 | A | | 1/1990 | Chamberland | |
| 4,897,890 | A | | 2/1990 | Walker | |
| 4,903,359 | A | | 2/1990 | Rogers | |
| 4,908,895 | A | | 3/1990 | Walker | |
| 4,935,968 | A | | 6/1990 | Hunt et al. | |
| 4,947,500 | A | | 8/1990 | Seiler | |
| 4,949,413 | A | | 8/1990 | Goodwin | |
| 4,949,414 | A | | 8/1990 | Thomas et al. | |
| 4,951,335 | A | | 8/1990 | Eady | |
| 4,955,095 | A | | 9/1990 | Gerrick | |
| D313,973 | S | | 1/1991 | Walker | |
| 4,982,466 | A | | 1/1991 | Higgins et al. | |
| 4,986,738 | A | | 1/1991 | Kawasaki et al. | |
| 4,991,244 | A | | 2/1991 | Walker | |
| 4,998,310 | A | | 3/1991 | Olson | |
| 5,003,654 | A | * | 4/1991 | Vrzalik | 5/715 |
| 5,005,238 | A | | 4/1991 | Freet | |
| 5,025,519 | A | | 6/1991 | Spann et al. | |
| 5,029,352 | A | | 7/1991 | Hargest et al. | |
| 5,038,433 | A | | 8/1991 | Farley | |
| 5,062,169 | A | | 11/1991 | Kennedy et al. | |
| 5,065,485 | A | | 11/1991 | Zocco | |
| 5,070,560 | A | | 12/1991 | Wilkinson | |
| 5,077,849 | A | | 1/1992 | Farley | |
| 5,081,728 | A | * | 1/1992 | Skinner | |
| 5,083,332 | A | | 1/1992 | Foster et al. | |
| 5,101,527 | A | * | 4/1992 | Wadsworth, III et al. | |
| 5,103,519 | A | | 4/1992 | Hasty | |
| 5,105,488 | A | | 4/1992 | Hutchinson et al. | |
| 5,111,542 | A | | 5/1992 | Farley | |
| 5,144,707 | A | | 9/1992 | Callway et al. | |
| 5,170,522 | A | | 12/1992 | Walker | |
| 5,172,439 | A | | 12/1992 | Farley | |
| 5,178,811 | A | | 1/1993 | Farley | |
| 5,179,742 | A | * | 1/1993 | Oberle | |
| 5,179,744 | A | | 1/1993 | Foster et al. | |
| 5,182,826 | A | * | 2/1993 | Thomas et al. | 5/713 |
| 5,201,780 | A | | 4/1993 | Dismoor, III et al. | |
| 5,231,717 | A | | 8/1993 | Scott et al. | |
| 5,235,258 | A | * | 8/1993 | Schuerch | 5/616 X |
| 5,243,722 | A | | 9/1993 | Gusakov | |
| 5,243,723 | A | | 9/1993 | Cotner et al. | |
| 5,245,716 | A | | 9/1993 | Callaway et al. | |
| 5,259,079 | A | | 11/1993 | Visser et al. | |
| 5,267,364 | A | | 12/1993 | Volk | |
| 5,331,698 | A | | 7/1994 | Newkirk et al. | |
| 5,353,454 | A | | 10/1994 | Callaway et al. | |
| 5,367,728 | A | | 11/1994 | Chang | |
| 5,394,577 | A | | 3/1995 | James et al. | |
| 5,398,354 | A | * | 3/1995 | Balonick et al. | |
| 5,428,852 | A | * | 7/1995 | Tenuta et al. | |
| 5,509,154 | A | | 4/1996 | Shafer et al. | |
| 5,524,307 | A | * | 6/1996 | Griffin | |
| 5,542,136 | A | * | 8/1996 | Tappel | 5/710 |
| 5,544,376 | A | * | 8/1996 | Fromson | 318/16 X |
| 5,561,873 | A | * | 10/1996 | Weedling | |
| 5,594,963 | A | * | 1/1997 | Berkowitz | 5/713 |
| 5,600,214 | A | * | 2/1997 | Fromson | 318/16 X |
| 5,611,096 | A | * | 3/1997 | Bartlett et al. | 5/710 X |
| 5,652,484 | A | | 7/1997 | Shafer et al. | |
| 5,787,528 | A | | 8/1998 | Antinori | |
| 5,815,864 | A | * | 10/1998 | Sloop | 5/706 |
| 5,815,865 | A | * | 10/1998 | Washburn et al. | 5/713 |
| 5,848,450 | A | * | 12/1998 | Oexman et al. | 5/706 X |
| 5,873,137 | A | * | 2/1999 | Yavets-Chen | 5/713 |
| 5,903,941 | A | * | 5/1999 | Shafer et al. | 5/935 |
| 5,969,488 | A | * | 10/1999 | Fromson | 318/16 |
| 6,008,598 | A | * | 12/1999 | Luff et al. | 5/713 X |
| 6,037,723 | A | * | 3/2000 | Shafer et al. | 5/935 X |
| 6,047,424 | A | * | 4/2000 | Osborne et al. | 5/713 |
| 6,058,537 | A | * | 5/2000 | Larson | 5/710 |
| 6,079,065 | A | * | 6/2000 | Luff et al. | 5/710 X |
| 6,106,576 | A | * | 8/2000 | Fromson | 318/16 |
| 6,115,860 | A | * | 9/2000 | Vrzalik | 5/710 X |

* cited by examiner

MATTRESS STRUCTURE

CROSS-REFERENCE TO RELATED APPLICATIONS

This application is a division of copending application Ser. No. 08/565,409 filed Nov. 30, 1995 now U.S. Pat. No. 5,815,865.

BACKGROUND AND SUMMARY OF THE INVENTION

The present invention relates to bed and mattress structures and particularly to mattress structures which may be customized for individual users at the point of sale. The mattress of the present invention may be delivered to the user in a variety of forms assembled from kits provided at the point of sale to accommodate the musculoskeletal condition of the user. The mattress may also be customized at the factory or at some assembly location other than the point of sale based on a customer's reaction to a test mattress used at the point of sale, the test mattress comprising a plurality of air bladders arranged under the user with a system for recording air pressures producing the desired support and firmness for the user. These bladder air pressures may be converted at the factory to equivalent foam core structures having the desired support and firmness characteristics.

It is well known to provide foam support pads or mattresses for supporting a user reclining on the pad. For example, U.S. Pat. Nos. 4,879,776; 5,038,433; 5,077,849; 5,111,542; and 5,172,439, all to Farley, disclose mattress overlays and pads for supporting a user. In addition, U.S. Pat. Nos. 4,449,261 to Magnusson and U.S. Pat. No. 4,991,244 to Walker disclose mattress borders for receiving core mattresses, and U.S. Pat. No. 5,105,488 to Hutchinson et al.; U.S. Pat. No. 4,803,744 to Peck et al.; and U.S. Pat. Nos. 4,424,600 and 4,435,864 to Callaway, disclose supporting surfaces having selectively adjustable firmness.

What is needed is a mattress that can be prepared using a mattress kit for customizing the mattress either at the point of sale or at a factory using data generated at the point of sale to provide a user with a mattress having reduced interface pressure while providing the user with his or her individually desired support and firmness characteristics. The improved mattress should be capable of side-by-side customization when the mattress is sized for use on queen-sized beds and king-sized beds so that two sleeping partners are each provided with their individually desired support and firmness characteristics on the same bed. The improved mattress should also be compatible with an articulating bed so that the mattress can be moved to a variety of positions selected by the user.

In addition, the improved mattress should be provided with features such as a "warm air release" to warm the extremities of the user, multiple longitudinal zones that can be controlled to vary the support and firmness characteristics perceived by the user, and it should be provided with a hand held controller having a key pad including a display that is easy to read to determine the status of various features of the bed, buttons that are located for convenient manipulation for adjusting various aspects of the bed and mattress structure, and memory setting capability for matching a desired bed deck position with desired firmness and support characteristics so that by simply pressing one button the bed automatically moves to the user-selected position and the mattress automatically assumes the user-selected firmness and support characteristics selected for each zone of the mattress.

According to the present invention, a plurality of mattress structure components is provided. The components are arranged for selective assembly of the components to provide a customized mattress structure at the point of sale to accommodate the musculoskeletal condition and interface pressure preference of the user. The mattress structure components include a perimetral frame having a head end foam section, a foot end foam section, and longitudinally extending side foam sections joining the head and foot foam sections to provide a longitudinally extending foam frame. The foam frame has a central opening above which the user will rest and the frame sections have upper surfaces lying generally in the same common plane.

The mattress structure components additionally include a plurality of cores for filling the central opening. The cores are provided in a variety of firmness and support characteristics such that various combinations of firmness and support can be provided. A plurality of toppers cover the frame and the central opening and the selected cores therein. The plurality of toppers include toppers having various firmness and support characteristics and can be made from foam rubber and can include air bladders, water bladders, or bladders for containing other fluids.

In preferred embodiments, the mattress is supported by an articulating deck having longitudinally spaced head, seat, thigh, and foot sections. The head, thigh, and foot sections of the illustrative articulating deck are movable relative to each other. The head, thigh, and foot sections are infinitely adjustable between a generally planar sleeping position and reclining positions to allow the bed to attain any desired position within the range of movement of the head, thigh, and foot sections, thus accommodating changes of position of the user on the bed. Preferably, the range of movement of the foot section is limited to positions generally parallel to the seat section and the downward range of movement of the thigh section is limited to the sleeping position so that the feet of the user remain elevated above the torso of the user.

The mattress is suitable for use with such an articulating deck. The mattress includes a head portion for supporting the scapula and the lumbar of the user, a seat portion for supporting the user's sacrum, a thigh portion for supporting the thighs of the user, and a foot portion. Each named mattress portion is associated respectively with the head, seat, thighs, and feet of the person resting on the sleeping surface of the bed as well as with the underlying head, seat, thigh, and foot sections of the deck.

The mattress includes a mattress cover having a top mattress cover and a bottom mattress cover attached to the top mattress cover by a perimetral zipper. The top and bottom mattress covers define a mattress interior receiving a plurality of mattress structure components. The zipper is positioned so that the bottom cover can be placed on a surface and used as a template for building the mattress with a "bottom up" assembly technique placing the components on the bottom of the mattress on top of the bottom cover and building the other components thereon. The zipper is also positioned to facilitate a "top down" assembly by starting with the top cover and first adding the components on the top of the mattress to the top cover and building the other components thereon.

The mattress structure components include a frame preferably made from a relatively firm foam rubber such as a high resiliency, high density urethane foam. The frame is positioned generally along the perimeter of the mattress. Use of a relatively firm foam provides support characteristics that aid users as they ingress and egress to and from an upwardly-facing sleeping surface of the mattress and that prevent the user from rolling off of the sleeping surface. The frame is formed to include a central opening beneath the sleeping surface and above which the user will rest.

A plurality of cores including air bladders, "zone foam" elements, "sculptured foam" shaped from foam blocks, and combinations thereof are provided for filling the central opening. The cores are selected to customize the firmness, support, and interface pressure characteristics to meet the individual desires of each user. To customize the mattress in such a fashion requires considering the combination of each individual's height, weight, body type, weight distribution, health conditions, and preferences.

The preferred method for customizing the mattress is initiated when a potential user completes a questionnaire to aid in the analysis of that user's "sleep profile." The sleep profile assesses such factors as the user's general health and sleep habits. A firmness recommendation is computed either in terms of a pressure for various zones of a "test mattress" containing an air bladder or in terms of a foam type and density for each zone. In addition, a surface recommendation is established based on the user's responses to a surface recommendation questionnaire.

Once the surface and hardness recommendations are established, the user lies on a test sleeping surface containing an air bladder that is pressurized to match the firmness recommendation. Zones of the air bladder are then adjusted to match the preferences of the user and the resulting preferred firmness readings are recorded. An algorithm has been developed that translates the preferred firmness readings into a customized bed configuration. For example, the preferred firmness readings can be translated to establish the foam density that, if incorporated into a mattress will provide the firmness and support characteristics similar to those provided by the test sleeping surface having the preferred firmness readings.

Once the customized bed configuration is established, a mattress can be assembled from a kit at the point of sale containing the plurality of cores for the user to test and verify that the mattress meets his or her preferences. If the mattress is not satisfactory, it can be adjusted at the point of sale. Once the user is satisfied, he or she can immediately take delivery of the completed customized mattress if desired. In the alternative, once the customized bed configuration is established, the data describing this configuration can be transmitted to a factory at which the mattress is assembled for delivery to the user.

In preferred embodiments, the mattress in accordance with the present invention can be sized for a twin bed, a double bed, a queen-sized bed, or a king-sized bed. When the mattress is sized for queen- and king-sized beds, both sides of the mattress can be individually customized if desired to provide the firmness and support characteristics desired by individual sleep partners by customizing the core and customizing the topper to provide the desired firmness and support for each side of the bed. In such a "side-by-side" customization, the core and toppers supporting each user on separate halves of the mattress are distinct and separate. Having distinct and separate cores and toppers facilitates this customization while also serving to minimize the transmission of motion from one half of the mattress to the other when one of the sleeping partners moves.

As mentioned above, the mattress can be provided with an air bladder having independent zones that are selectively adjustable by the user to provide varied firmness and support characteristics. If the same mattress is used on a bed having an articulating deck, the mattress can be provided with a hand held controller for use by the user that controls the adjustment of both the position of the deck and the support characteristics of each bladder zone. In addition, the hand held controller can include a "memory set" feature which allows the user to establish preferred deck and mattress combination settings.

For example, the user may desire a first set of support characteristics at each zone of the mattress when the deck is in a generally planar sleeping position. The user could establish this set of characteristics as the first memory setting. The user may also desire a different set of support characteristics at each zone of the mattress when the deck is positioned in a reclining position away from the generally planar sleeping position. If the user establishes this second set of characteristics as the second memory setting, the user can automatically move the bed and mattress structure to either of the first or second set of characteristics by simply pressing a button. Of course, even with these memory settings established, the user can move the bed and mattress to other positions as desired.

In addition, the mattress can be provided with combinations of air bladders, zone foam elements, and sculptured foam to produce a "combination mattress." For example, the mattress can be provided having an air bladder supporting the scapula, foam supporting the lumbar, an air bladder in the seat portion supporting the sacrum, and foam supporting the thighs and legs. If desired, the air bladders can be in fluid communication so that they inflate and deflate at the same times and to the same pressures or the air bladders can be independent of one another and independently controlled by the user so that they user can establish different characteristics of support and firmness for each of the scapula and the sacrum.

It is therefore an object of the present invention is to provide a unique mattress structure which may be customized for individual use to provide the optimum health and comfort characteristics for the user and also to provide, for use with such a mattress, an articulating frame. In some embodiments of the present invention, the mattress comprises air cores or air bladders arranged in longitudinally spaced zones and a control system for controlling the firmness of the zones of the mattress with respect to various positions of the articulating frame so that the user can customize the mattress for his or her preferred firmness and support characteristics at any angular position of the deck. In other embodiments, the mattress comprises a sculptured foam core or a plurality of longitudinally spaced foam zone cores or blocks selected to match the musculoskeletal condition of the user.

The mattress of the present invention may be assembled at the point of sale to comprise a foam perimetral frame defining a longitudinally extending central opening above which the user will rest and into which various core structures from a supply of different core structures may be selectively placed. For example, the central space may be filled with an air bladder core, the pressure of which may be controlled and such air cores may have one zone throughout the length of the space or a plurality of longitudinally spaced air zones or air bladders throughout the length of the space, for example, one zone for the head and shoulder portion supporting the scapula and the lumbar, one zone for the seat portion supporting the sacrum, one zone for the thigh portion, and one zone for the foot portion. In other cases, the central space may be filled with a sculptured foam core or a plurality of foam zone cores or blocks which are selected from a variety of zone foam blocks having various characteristics of support and firmness. The frame with the filled core opening may be covered with one or more toppers, each of which may be selectively picked from a stock of toppers to give the user a desired comfort.

It is another object of the present invention, therefore, to provide, at the point of sale where the user will be available, a modular kit for constructing a mattress which has the firmness and body support characteristics best suited for the user. The present invention contemplates that a plurality of cores of various characteristics will be stocked along with the foam frames and plurality of toppers. Each mattress may be customized by selecting components from the stock of parts at the point of sale. For ease of transportation, the selected assembly may be given to the user at the point of sale in knocked-down-assembly or KDA form for transportation home and reassembly.

It is another object of the present invention to provide, in combination with such a mattress, an articulating frame of the type typically referred to as a hospital bed frame. Such articulating frames have a movable head and shoulder section which includes the lumbar section, a fixed seat section, a movable thigh section and a movable foot section. It is well known that the head and shoulder section tilts upwardly from the horizontal position to an upper position and selected points therebetween. The seat section is typically fixed to stay horizontal. The thigh section typically tilts upwardly from the seat section and the foot section typically remains generally parallel to the seat section. These head and shoulder, seat, thigh and foot sections are longitudinally spaced on an articulating frame. It is also well known that these articulating frame sections may be selectively moved by all sorts of drive means including elective motor driven systems, hydraulic systems or pneumatic systems. It will be appreciated that, in accordance with the present invention, various mechanical and electromechanical actuators and drivers may be used to raise and lower the intermediate frame on the base frame as well as to raise and lower individual deck sections relative to the intermediate frame.

It is well known in the hospital bed art that electric drive motors with various types of transmission elements including lead screw drives and various types of mechanical linkages may be used to cause relative movement of portions of hospital beds. It is also well known to use pneumatic actuators to actuate and/or move individual portions of hospital beds. As a result, the terms "means for raising and lowering" in the specification and in the claims, therefore, are intended to cover all types of mechanical, electromechanical, hydraulic and pneumatic mechanisms, including manual cranking mechanisms of all types, for raising and lowering portions of the hospital bed of the present invention.

It is another object of the present invention to provide a control system for an articulating frame with the control system comprising a computer and software designed to preselect air bladder firmness to accommodate various articulated positions of the frame sections.

Still another object of the present invention is to provide a method for selecting mattress structure components to provide a customized foam mattress structure to accommodate the musculoskeletal condition of the user comprising the steps of providing a plurality of mattress structure components arranged for selective assembly of the components, the components comprising a plurality of foam cores for filling a longitudinally extending central opening in a mattress, the foam cores having a variety of shapes and support and firmness characteristics from which to select a desired assembly. A test mattress is also provided having a similar longitudinally extending central opening filled with a plurality of longitudinally spaced apart air bladders extending transversely across the central opening and an air supply for selectively filling each air bladder to various pressures. A user is placed above the central opening supported on the plurality of air bladders. The air pressure in each bladder is adjusted to a selected pressure to provide the support and firmness desired by the user. Then, using the air pressure established for each bladder, an equivalent foam core is selected to have the desired support and firmness characteristics corresponding to the air pressure readings. The selected equivalent foam core is placed in the central opening to provide the customized mattress. The selected equivalent foam core may comprise a plurality of transversely extending zone foam blocks to occupy the positions, respectively, of the air bladders in the test mattress with each zone foam block having firmness and support characteristics corresponding to the selectively determined air pressure of its associated air bladder. Further, the selected equivalent foam core may comprise a sculptured foam core having a width and a length conformingly to fit into the central opening with transversely extending, longitudinally spaced sections of the sculptured core being shaped and formed, to provide firmness and support characteristics corresponding to the selectively determined air pressures of their respective associated air bladders in the test mattress. It will be appreciated that software having appropriate algorithms may be used for making the selection of foam cores to match the selected air pressure.

Another object of the present invention is to provide a control system for such a bed and mattress structure with the bed having such an articulating deck with movable sections. The control system comprises means for controlling the drive means for tilting the deck sections to various desired positions, means for controlling the air supply for filling the air bladders to desired air pressures, and a microprocessor and software for controlling the drive control means and the air supply control means to establish the desired frame positions and corresponding bladder pressures. The software of the present invention may be programmed to permit the user to preselect desired air pressures in the bladders to correspond to various positions of the deck sections. The software may also be programmed to permit the user to preselect and store in the control system various desired frame section positions and corresponding pressures. The control system of the present invention may include a receiving control unit mounted on the bed structure and a portable, hand-held remote transmitting control unit for actuation by the user.

Another object of the present invention is to provide a mattress structure comprising an elongated sculptured foam mattress core having a head end, foot end, longitudinally extending sides, a bottom surface and an upper surface above which the user rests. This sculptured core has longitudinally spaced apart, transversely extending sections to be under, respectively, the head and shoulder, seat, thigh and feet of the user. At least some of the core sections are sculptured by removal of foam by transversely extending cuts from the upper surface of the core to provide sections having desired firmness and support characteristics. These transversely extending cuts may illustratively extend between the sides of the core to provide transversely extending grooves having selected depths and longitudinal spacing therebetween to provide upwardly and transversely extending ridges for supporting the user, each of the ridges having support and firmness characteristics determined by the firmness of the foam and the longitudinal and depth dimensions of the grooves. Such a core may also be provided with longitudinally spaced, transversely and upwardly extending cuts in the lower surface to accommodate the tilting movement of the mattress by the bed frame upon which the mattress is placed, the lower surface cuts being longitudinally spaced to accommodate tilting movement of the head and shoulder, seat, thigh and feet section of the core. A foam frame may be placed about such a sculptured core in accordance with the present invention. At least one foam topper may be placed above the frame and core-upper surface with the toppers selected to have desired support and firmness characteristics. In addition, a foam and fiber pillow top (foam covered with a fiber fabric) also selected to have desired support and firmness characteristics may be placed on top of the topper.

Another object of the present invention is to provide a mattress structure comprising a bottom layer of material providing an upwardly facing rectangular platform upon which the mattress rests and defining the ends and sides of the mattress, a perimetral rectangular frame comprising foam side and end sections to provide a longitudinally extending central opening above which the user will rest, a core structure for filling the central opening, at least one foam topper covering the frame and the core structure, and a mattress cover enclosing the bottom layer of material, frame, core structure and topper. In accordance with the present invention, the mattress cover is provided with an opening adjacent the bottom of the mattress and through which the mattress is designed for either bottom-up or top-down assembly through the mattress cover opening. Top-down assembly includes, for example, sequentially placing the topper, frame, core structure and bottom layer of material to build the mattress structure, while bottom-up assembly includes sequentially placing the bottom cover, frame, core structure, and topper to build up the mattress structure. The mattress cover opening may be defined by a perimetral zipper closure along the perimeter of the bottom of the mattress.

Another object is to provide such a mattress with a double wide frame providing first and second longitudinally extending openings above which separate users will rest. A first core structure is provided for filling the first opening and a second core structure is provided for filling the second opening. The first and second core structures have firmness and support characteristics separately customized for their separate users in accordance with this invention.

Still another object of the present invention is to provide such a mattress structure comprising an air heater arrangement disposed in the mattress to provide a "warm air release," preferably to warm the extremities of the user. The top cover of the mattress can be formed to include an enclosed channel receiving air from a source of compressed air. The enclosed channel is preferably made from a light weight and air impermeable material so that air is directed along the length of the channel. The material is formed to include small openings that direct a small volume of air from the channel across the surface of the mattress. This "cool air release" can improve the comfort of the user.

In addition, an air heater is interposed between the source of compressed air and the channel so that heated air can be supplied to the channel. The air heater can be selectively operated so that when the air heater is operating, the released air is warm, the "warm air release" warming the user. Preferably, the warm air is directed to warm the extremities of the user. In preferred embodiments, a valve is positioned between the source of compressed air and the channel so that the channel can be operated or not operated at the discretion of the user.

Additional objects, features, and advantages of the invention will become apparent to those skilled in the art upon consideration of the following detailed description of the preferred embodiments exemplifying the best mode of carrying out the invention as presently perceived.

BRIEF DESCRIPTION OF THE DRAWINGS

The detailed description particularly refers to the accompanying figures in which:

FIG. 1(*b*) is a view similar to FIG. 1(*a*) showing a mattress including a core having a combination of zone foam blocks and air bladders with zone foam blocks positioned to support the lumbar region of the back of the user and the thighs and legs of the user and air bladders positioned to support other portions of the user;

FIG. 1(*c*) is a view similar to FIG. 1(*b*) showing a mattress including a core having a combination of zone foam blocks and air bladders with air bladders positioned to support the lumbar region of the back of the user and the thighs of the user and zone foam blocks positioned to support other portions of the user;

FIG. 8(*b*) is a view similar to FIG. 8(*a*) of a four-zone air bladder in which zones of the air bladder which are not adjacent to one another are in fluid communication showing an upper back zone in fluid communication with a seat zone through a first tube positioned outside of an internal region of the air bladder and a lower back zone in fluid communication with a foot zone through a second tube positioned outside of an internal region of the air bladder;

DETAILED DESCRIPTION OF THE DRAWINGS

Figure 1A:
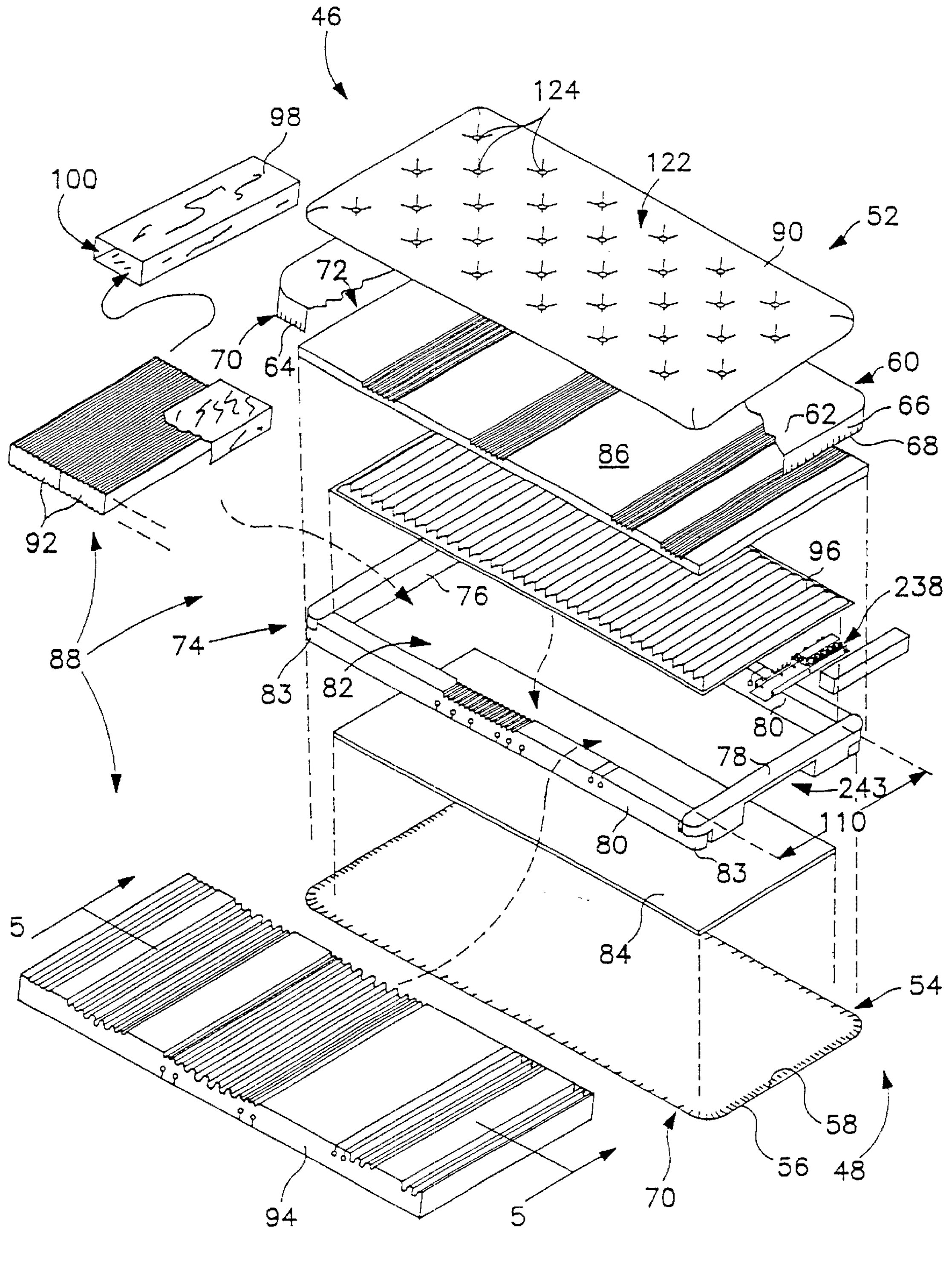
FIG. 1(*a*) is an exploded perspective view of a mattress in accordance with the present invention showing a bottom cover positioned beneath a foam bottom and a frame, a plurality of cores receivable above the foam bottom in a central opening formed in the frame, the plurality of cores including either a sculptured foam core, transversely extending zone foam blocks, an air bladder, or a combination thereof, the mattress also including a foam topper positioned to lie above the frame and the core, a top cover surrounding the topper, the frame, and the foam bottom, the top cover including a zipper half engaging a zipper half on the bottom cover to attach the top cover thereto, and a pillow top attached to the top of the top cover.
Figure 1C:
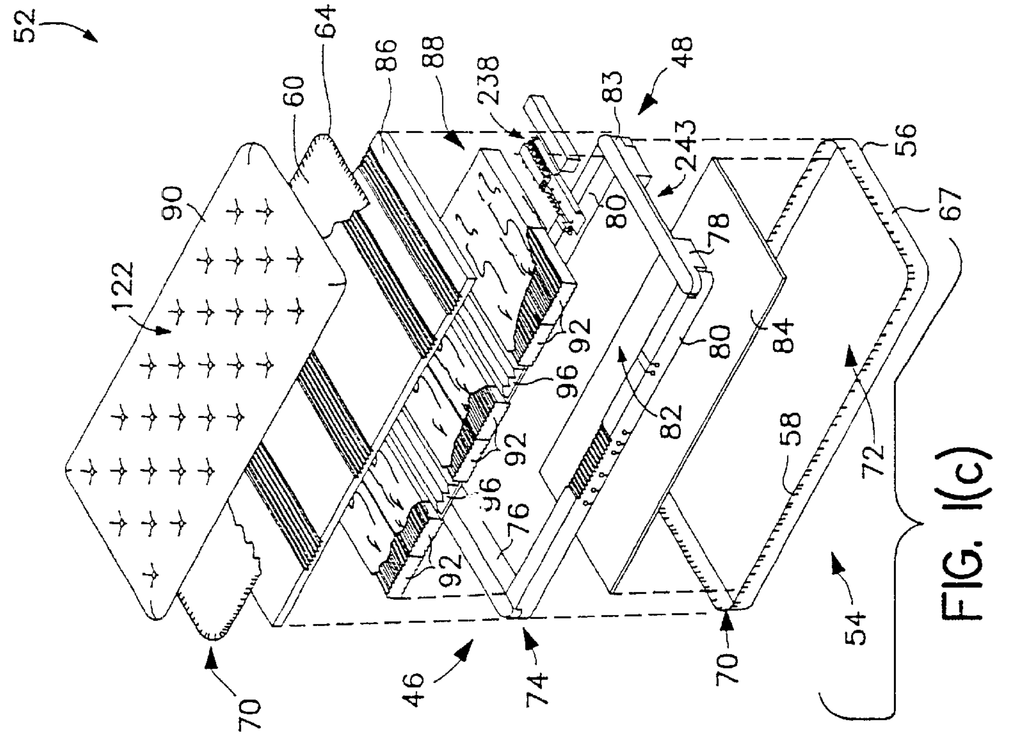
Figure 1B:
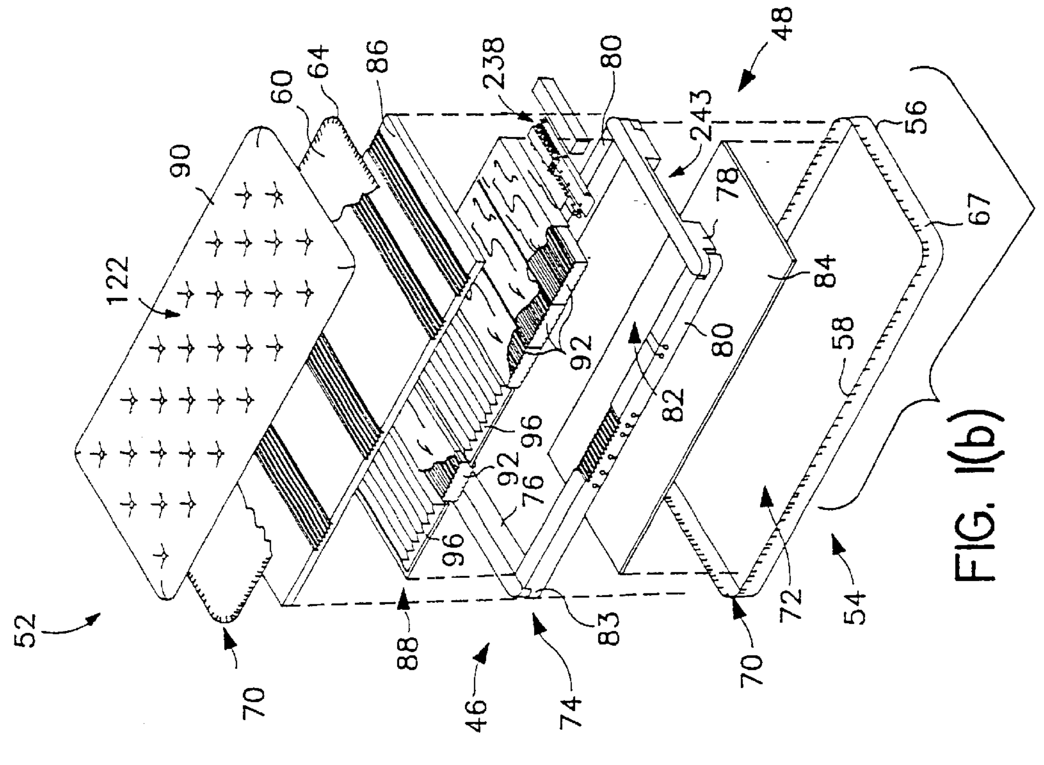

A bed and mattress structure 50 includes a mattress 52 in accordance with the present invention as illustratively shown in FIGS. 1(*a*) and 2. As used in this description, the phrase "head end 46" will be used to denote the end of any referred-to object that is positioned to lie nearest head end 46 of bed and mattress structure 50. Likewise, the phrase "foot end 48" will be used to denote the end of any referred-to object that is positioned to lie nearest foot end 48 of bed and mattress structure 50.

Mattress 52 includes a bottom cover 54 having a perimeter edge 56 and a first zipper half 58 attached to perimeter edge 56 as shown in FIGS. 1(*a*) and 2. Mattress 52 also includes a top cover 60 which cooperates with bottom cover 54 to define a mattress interior 72.

Top cover 60 includes an upwardly-facing top portion 62 and a downwardly-extending side portion 66 as shown in FIGS. 1(*a*) and 2. Side portion 66 includes a bottom edge 68 and a second zipper half 64 attached to bottom edge 68, second zipper half 64 attaching to first zipper half 58 to form zipper 70 which connects top cover 60 and bottom cover 54.

Although zipper 70 is positioned to lie adjacent to bottom-edge 68, a bottom cover could be provided having an upwardly-extending side-portion 67 as shown in FIGS. 1(*b*) and 1(*c*) defining a mattress side and the second zipper half could be attached to side portion 67 of the bottom cover so that zipper 70 could be positioned along the mattress side or the upper perimetral edge of mattress 52. Zipper 70 can therefore be positioned to lie adjacent to bottom edge 68 or at any position along the mattress side, which in preferred mattress 52 includes side portion 66, without exceeding the scope of the invention as presently perceived. However, positioning zipper 70 adjacent bottom edge 68 provides certain assembly related advantages described below while also improving the appearance of mattress 52 by allowing zipper 70 to be easily hidden.

A frame 74 having a head end foam section 76, a foot end foam section 78, and longitudinally extending side foam sections 80 joining the head end and foot end foam sections 76, 78 is received in mattress interior 72 as shown in FIGS. 1(*a*) and 2. In preferred embodiments, frame 74 is formed with rounded corners to enhance the appearance of mattress 52. In addition, joints 83 connect head end foam section 76 to side foam sections 80 and foot end foam section 78 to side foam sections 80. Joints 83 are preferably lap joints having portions of head end and foot end foam sections 76, 78 overlapping and fastened to respective portions of side foam sections 80. Forming joints 83 in this manner results in additional support provided to head end foam section 76 when mattress 52 slides past head end 46 of foundation 120 during articulation of deck 138.

Head end, foot end, and side foam sections 76, 78, 80 of frame 74 cooperate to define a central opening 82 as shown best in FIGS. 1(*a*) and 2 above which a user (not shown) will rest. A foam bottom 84 is received in central opening 82 and foam bottom 84 and frame 74 lay against bottom cover 54. A topper 86 rests against the top of frame 74 and above central opening 82 to engage top portion 62 of top cover 60. A core or core structure 88 is received in central opening 82 and is positioned to lie between foam bottom 84 and topper 86. Having topper 86 sized to cover both frame 74 and core 88 minimizes the ability of the user to perceive the interface between frame 74 and core 88.

In preferred embodiments, a pillow top 90 is attached to the top of top portion 62 of top cover 60 and is positioned to lie outside of mattress interior 72 as shown in FIGS. 1(*a*) and 2 to define a sleeping surface 122 on which a user will rest. Top cover 60 is preferably made from a material having a low coefficient of friction such as a polypropylene anti-shear material to allow for the sliding movement of pillow top 90 relative to top cover 60 near head end 46 of mattress 52. In addition, top cover 60 should be somewhat elastic so that the user can "sink into" mattress 52 allowing mattress 52 to conform to the user's shape, thereby relieving interface pressure.

Pillow top 90 typically includes a foam pad (not shown) covered by fabric and adorned, for example, by buttons 124, ornamental stitching, or the like to enhance the appearance of pillow top 90. Pillow top 90 can be attached to top cover 60 using any suitable method such as by a zipper (not shown), adhesive (not shown), straps (not shown), or even sewing pillow top 90 to top cover 60. However, as described below with reference to FIG. 3, pillow top 90 is preferably attached to top cover 60 using hook and loop type fasteners so that pillow top 90 is easily removable and replaceable. Mattress 52 can alternatively be provided without pillow top 90, in which case the upwardly-facing surface of top portion 62 of top cover 60 serves as sleeping surface 122.

Core 88 can alternatively include either a set of zone foam blocks 92, a sculptured foam core 94, an air bladder 96, or a combination thereof as shown in FIGS. 1(*a*)–(*c*) and 2. In preferred embodiments, frame 74, foam bottom 84, topper 86, zone foam blocks 92, sculptured foam core 94, and an interior portion (not shown) of pillow top 90 may be made from a foam rubber such as urethane foam. The firmness and support characteristics of the foam rubber can be varied in accordance with the desires of the user of mattress 52. The firmness and support characteristics of the foam rubber is varied by varying either the density of the foam or the shape of the outer surfaces of the foam.

Although urethane foam is the preferred material for these components, any material providing support and firmness characteristics similar to those provided by foam rubber can be used without exceeding the scope of the invention as presently perceived. For example, topper 86 can be made from latex foam or urethane foam, or in the alternative it can include an air bladder, a water bladder, or a bladder for other fluids without exceeding the scope of the invention as presently perceived.

Figure 3:
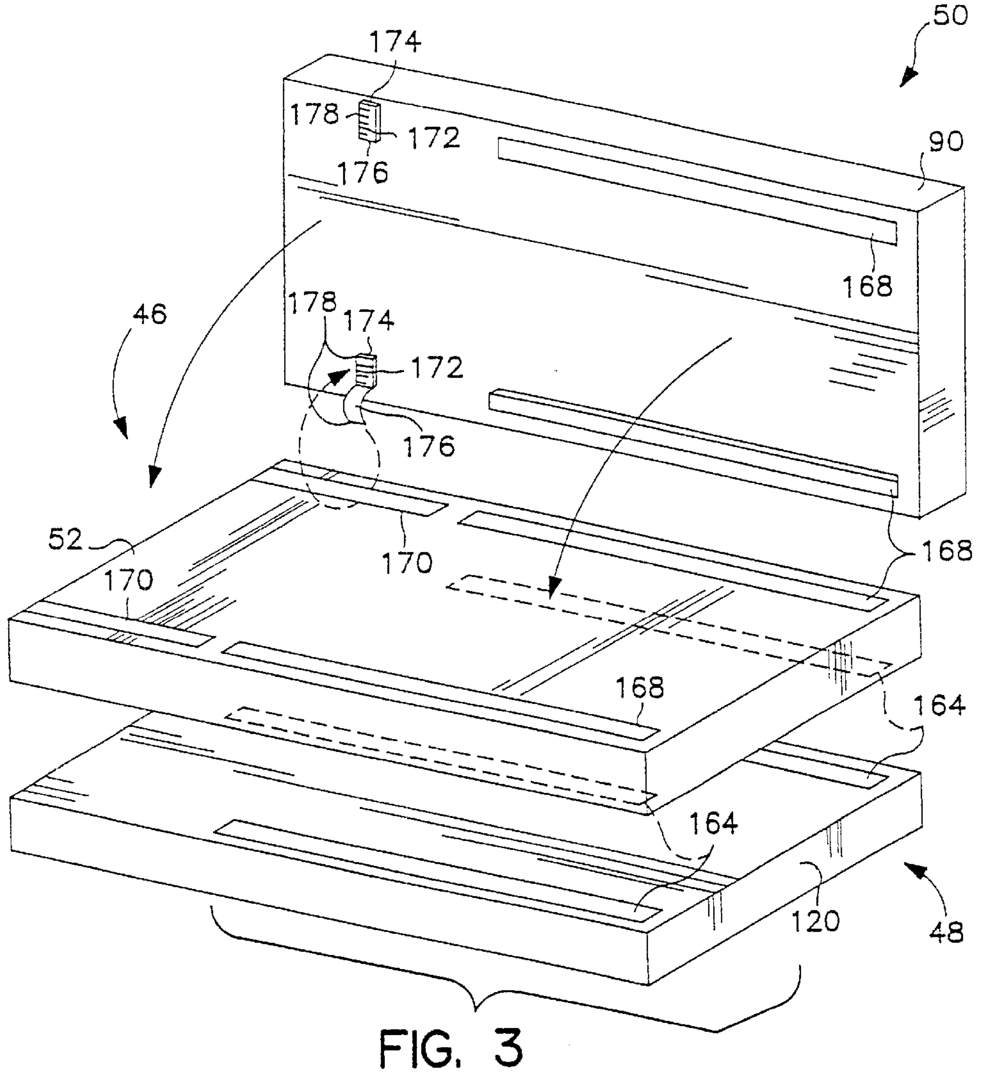
FIG. 3 is an exploded perspective view of a mattress and bed structure in accordance with the present invention including a foundation and the mattress and showing the mattress positioned to lie above the foundation and a pillow top positioned to lie above the mattress, the mattress being attached to the foundation by a pair of elongated hook and loop type fasteners attached to the foundation and to the mattress at a foot end of the mattress to allow relative longitudinal motion at a head end of the mattress and foundation during articulation of the mattress and foundation, the pillow top being connected to the top cover of the mattress by a pair of elongated hook and loop type fasteners attached to a top cover of the mattress and attached to the pillow top, the pillow top also being coupled to the mattress by a pair of elongated straps fixed to the head end of the top cover of the mattress to form longitudinal loops and short straps which feed through the loops and are attached to the pillow top so that the head end of the pillow top can slide longitudinally relative to the top cover of the mattress while remaining generally fixed in the transverse direction relative to the pillow top.

Mattress 52 typically rests on a foundation 120, as shown in FIG. 3, such as box springs, a stationary deck of a bed, an articulating deck of a bed, or the like. Mattress can also rest on a floor or any other generally planar, upwardly facing surface without exceeding the scope of the invention as presently perceived.

In preferred embodiments, foundation 120 and the underside of bottom cover 54 are provided with elongated mating portions of hook and loop type fasteners 164 so that mattress 52 is removably attached to foundation 120 as shown in FIG. 3. Fasteners 164 prevent lateral movement of mattress 52 relative to foundation 120. However, fasteners 164 are preferably spaced apart from head end 46 of bed and mattress structure 50 so that head end 46 of mattress 52 can slide longitudinally relative to head end 46 of foundation 120 as described below.

In addition, the underside of pillow top 90 and the upper side of top portion 62 of top cover 60 of mattress 52 are both provided with elongated mating portions of hook and loop type fasteners 168 as shown in FIG. 3 so that pillow top 90 is removably attached to mattress 52. Mattress 52 is also provided with a pair of longitudinally extending long loops 170 and pillow top 90 is provided with a pair of transversely extending short loops 172. Each short loop 172 includes a first end 174 that is fixed to pillow top 90 and a second end 176 that is attached to pillow top 90 using hook and loop type fasteners 178. Second end 176 of each short loop 172 is received bygone of long loops 170 respectively so that short loops 172 cooperate with long loops 170 to prevent transverse movement of pillow top 90 relative to mattress 52 while allowing the longitudinal sliding of pillow top 90 relative to mattress 52 during articulation of deck 138.

Figure 4:
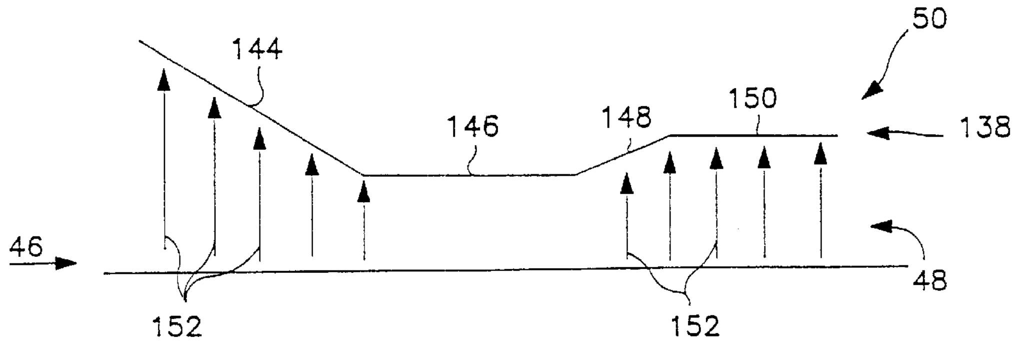
FIG. 4 is a diagrammatic view of an articulating deck for carrying the mattress in accordance with the present invention showing the deck moved to a position other than a generally planar sleeping position.

As described above, mattress 52 is configured for use on both stationary, generally planar, and upwardly facing surfaces on which mattress 52 rests during use by a user, as well as on a bed, table, or other device (not shown) having an articulating deck 138 as shown diagrammatically in FIG. 4. Illustrative articulating deck 138 includes a head section 144, a seat section 146, a thigh section 148, and a foot section 150. A light (not shown) or other illuminating device can be provided having an arm (not shown) or extending bracket attached to head section 144 so that the light extends to a position illuminating mattress 52. By attaching the arm to head section, the relative position of user's head and the light will remain generally fixed.

Typically, seat section 146 of deck 138 is fixed relative to the bed having a generally horizontal upwardly-facing surface carrying mattress 52 and head, thigh, and foot sections 144, 148, 150 are movable with respect to the bed (not shown) and with respect to each other to move mattress 52 so that the position of mattress 52 and the position of the user on top of mattress 52 changes. Drivers for moving head, thigh, and foot sections 144, 148, 150 are diagrammatically indicated by arrows 152 in FIG. 4. In the preferred articulating deck 138, foot section 150 is movable only to positions in which foot section 150 is generally parallel to seat section 146. In addition, the movement of preferred thigh section 148 is limited to positions between the generally horizontal sleeping position and positions upwardly from the sleeping position so that the feet of the user (not shown) remain generally vertically even with or elevated above the torso of the user.

Figure 5:
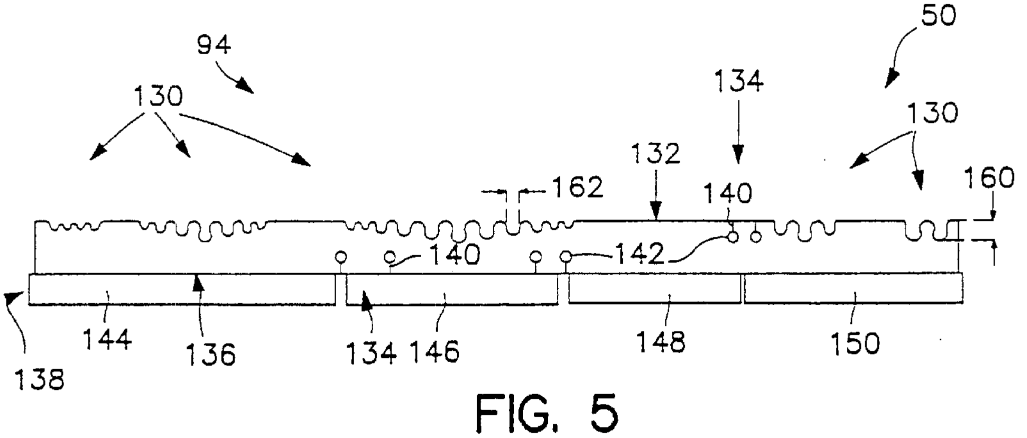
FIG. 5 is a diagrammatic sectional view taken along line 5—5 of FIG. 1(*a*) showing a sculptured foam core resting on an articulating deck of a bed, the deck being in a generally planar sleeping position.

It will be appreciated that various mechanical and electromechanical actuators and drivers may be used to raise and lower individual deck sections 144, 146, 148, 150 relative to the bed as shown in FIGS. 4–5. It is well known in the hospital bed art that electric drive motors with various types of transmission elements including lead screw drives and various types of mechanical linkages may be used to cause relative movement of portions of hospital beds. It is also well known to use pneumatic actuators including various types of air bladders powered by pressurized air to actuate and/or move individual portions of hospital beds. The terms "means for raising or lowering" in the specification and in the claims, therefore, are intended to cover all types of mechanical, electromechanical, hydraulic, and pneumatic mechanisms, including manual cranking mechanisms of all types, for raising and lowering portions of chair bed 50 of the present invention.

As indicated above, mattress 52 is attached to foundation 120 and pillow top 90 is attached to mattress 52 to allow sliding movement of head end 46 of mattress 52 relative to foundation 120 and of pillow top 90 relative to mattress 52. It will be apparent to those skilled in the art, that fixing one end of mattress 52 and pillow top 90 and then moving articulating deck 138 will cause shear forces between mattress 52 and foundation 120 and between pillow top 90 and mattress 52. Connecting mattress 52 to foundation 120 and pillow top 90 to mattress 52 as described above with respect to FIG. 3 will alleviate the shear forces by allowing head end 46 of mattress 52 and pillow top 90 to slide longitudinally relative to foundation 120 and relative to each other.

As described above, core 88 can include zone foam blocks 92. A typical set of zone foam blocks 92.found in mattress 52 includes a plurality of transversely extending zone foam blocks 92 that longitudinally abut one another. If mattress 52 is for use in a single bed as shown in FIG. 1(*a*) so that central opening 82 is a first width 110, each block 92 typically extends the full width 110 of central opening 82 to engage opposing side foam sections 80. Typically the plurality of zone foam blocks 92 fills the entire central opening 82 so that a first of blocks 92 engages head end foam section 76, a last of zone foam blocks 92 engages foot end foam section 78, and zone foam blocks 92 therebetween engage one another.

If the mattress is for use in a queen-sized bed (not shown), central opening 82 is a second width and each block 92 typically extends only one-half of the second width. In such instance, core 88 can alternatively include side-by-side combinations including a set of zone foam blocks 92, sculptured foam core 94, and air bladder 96. For example, sculptured foam core 94 can be received in opening 82 engaging one of side foam sections 80 and zone foam blocks 92 can be received in opening 82 engaging sculptured foam core 94 on one side and the other of side foam sections 80.

For another example, central opening 82 can receive side-by-side left and right sets of zone foam blocks 92. A first of the zone foam blocks 92 of the left set of zone foam blocks 92 engages head end foam section 76, a last of the zone foam blocks 92 of the left set of zone foam blocks engages foot end foam section 78, and each zone foam block 92 of the left set of zone foam blocks 92 engages one of side foam sections 80. A first of the zone foam blocks 92 of the right set of zone foam blocks 92 also engages head end foam section 76, a last of the zone foam blocks 92 of the right set of zone foam blocks engages foot end foam section 78, and each zone foam block 92 of the right set of zone foam blocks 92 engages the other of side foam sections 80. In addition, zone foam blocks 92 of the left set of zone foam blocks engage zone foam blocks 92 of the right set of zone foam blocks 92. Thus, in a queen-sized bed zone foam blocks 92 abut one another longitudinally and side-by-side.

Figure 2:
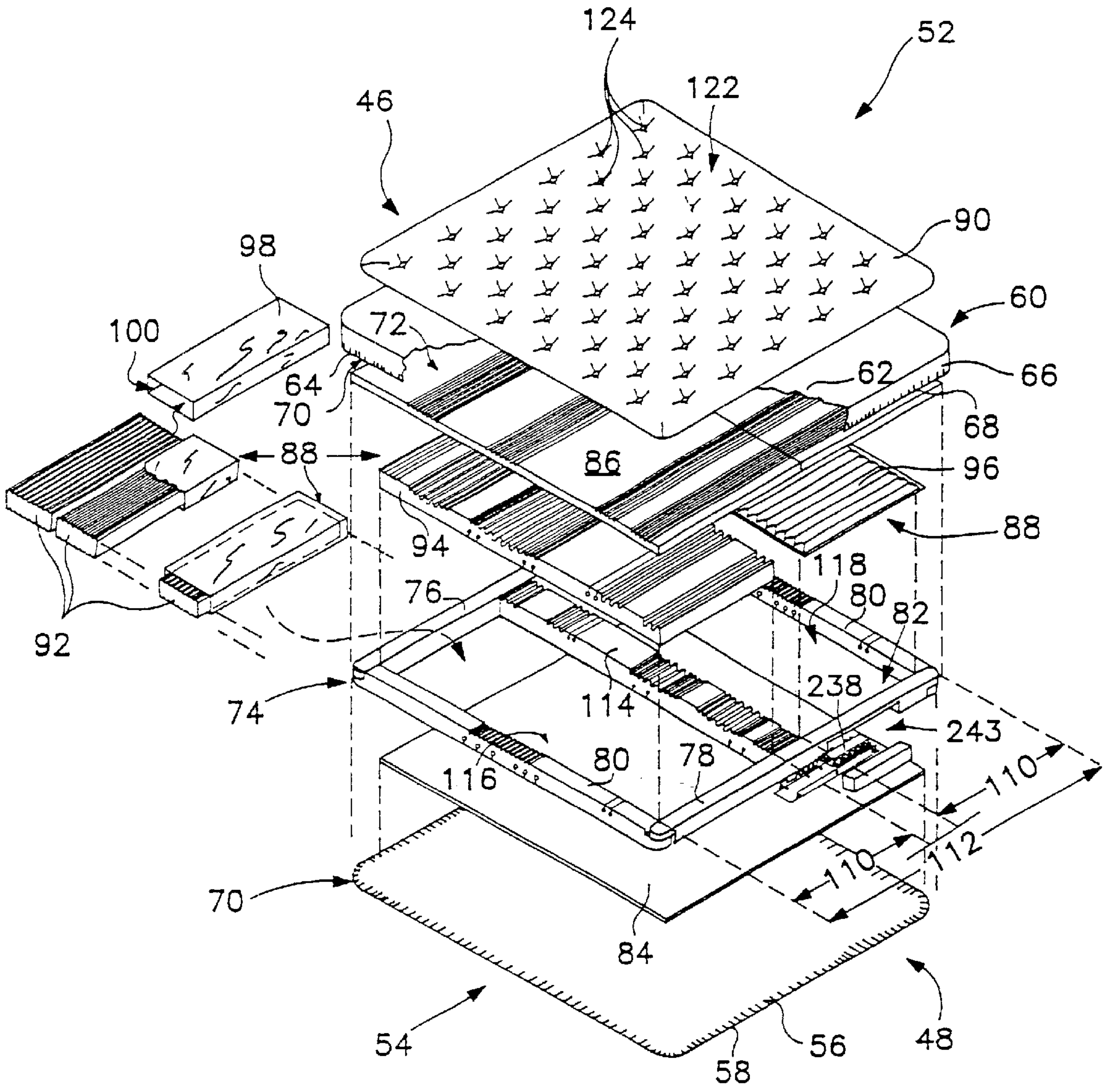
FIG. 2 is an exploded perspective view of a king-sized mattress similar to the mattress of FIG. 1(*a*) showing the bottom cover, the foam bottom, the frame, a foam divider received in the central opening of the frame to divide the central opening into two equally-sized side openings, the plurality of cores being alternatively receivable in the two side openings, the king-sized bed also including the topper, the top cover, and the pillow top.

If mattress 52 is for use in a king-sized bed as shown in FIG. 2, central opening 82 is a third width 112 and each block 92 typically extends less than one-half of the full width 112 of central opening 82. In such an instance, core 88 can additionally include a foam divider rail 114. Foam divider rail 114 divides central opening 82 into a first side opening 116 and a second side opening 118.

Preferably, first and second side openings 116, 118 have equal widths, and preferably foam divider rail 114 is sized so that the widths of first and second side openings 116, 118 are the same as first width 110 as shown in FIG. 2. Thus, blocks 92, sculptured foam core 94, and air bladder 96 can interchangeably fit in each of opening 82 of a single or twin bed as shown in FIG. 1(*a*) and first and second side openings 116, 118 and engage one of side rails 80 and foam divider rail 114 as shown in FIG. 2.

First opening 116 can receive any of zone foam blocks 92, sculptured foam core 94, and air bladder 96 and second opening 118 can receive any of the zone foam blocks 92, sculptured foam core 94, and air bladder 96 as shown in FIG. 2. The selection of pieces of core 88 received by first opening 116 is independent of the selection of pieces of core 88 of second opening 118, so that core 88 for a mattress for use with a king-sized bed can include foam divider rail 114, zone foam blocks 92, sculptured foam core 94, air bladder 96, or a combination thereof.

For example, if core 88 includes two sets of zone foam blocks 92 as described above for a queen-sized mattress, each block 92 will extend the full width of the respective first or second opening 116, 118 to engage foam divider rail 114 and opposing side foam section 80. Typically each set of zone foam blocks 92 fills the entire first or second opening 116, 118 so that a first of blocks 92 engages head end foam section 76, foam divider rail 114, and one of the side foam sections 80, a last of zone foam blocks 92 engages foot end foam section 78, foam divider rail 114, and the same of the side foam sections 80, and blocks 92 therebetween engage one another, foam divider rail 114, and the same of the side foam sections 80.

Each zone foam block is preferably provided with an anti-shear coating so that each zone foam block 92 can move in a vertical direction independently of adjacent zone foam blocks 92 and independently of frame 74. The anti-shear coating can be a coating formed on or applied to zone foam blocks 92 as well as a sleeve 98 having an interior 100 receiving zone foam block 92 as shown in FIGS. 1(*a*) and 2. Sleeve 98 is preferably made from a material having a low coefficient of friction such as "parachute material" or nylon.

The firmness of zone foam blocks 92 can vary from zone foam block 92 to zone foam block 92. Preferably, the firmness ranges approximately between an average indentation load deflection (ILD) of 15 to 98. Preferred zone foam blocks 92 are provided with ribbed upper and lower surfaces as shown in FIGS. 1(*a*)–(*c*) and 2. Ribs on the surfaces result in less force being required to compress zone foam blocks 92 than would be required without the ribs. This means that even when little weight is applied to zone foam blocks 92, blocks 92 will compress and contour to user's shape, thereby reducing interface pressures, and essentially reducing the ILD so that the ILD can be "fine-tuned" by the addition of ribs.

As described above, core 88 can also include sculptured foam core 94 as shown in FIGS. 1(*a*), and 2–4. Sculptured foam core 94 is typically a unitary piece of foam of uniform firmness that has been sculptured to a desired shape. However, sculptured foam core 94 can be formed from a piece of foam having firmness that varies along its length or across its width without exceeding the scope of the invention as presently perceived.

Figure 6:
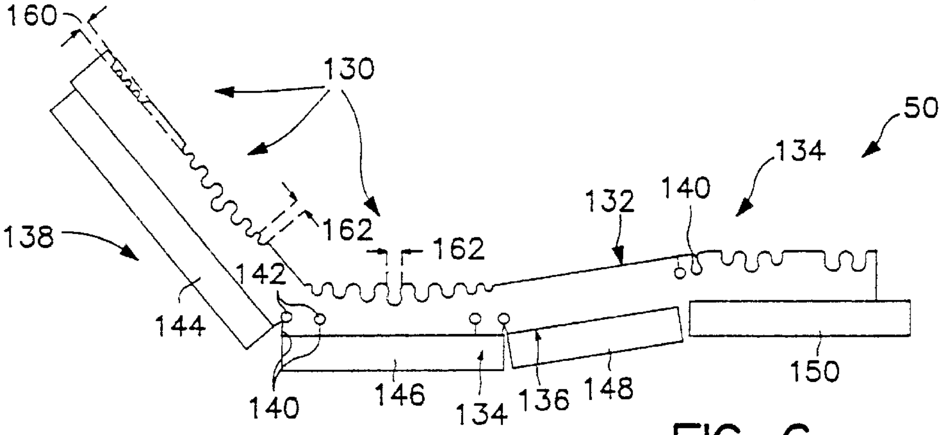
FIG. 6 is a view similar to FIG. 5 showing the deck in a position having the head section lifted to an upward raised position, the thigh section lifted slightly to an upward raised position, and the foot section elevated above and generally parallel to the seat section, cuts formed in the sculptured foam core on the surface opposite the folds allowing the sculptured foam core to generally conform to the shape of the deck.

Sculptured foam core 94 is formed to include transversely extending troughs 130 along a top surface 132 of sculptured foam core 94 as well as transversely extending cuts 134 extending inwardly from both top surface 132 and a bottom surface 136 of sculptured foam core 94, as shown best is FIGS. 5 and 6 which show sculptured foam core 94 resting on a diagrammatic articulating deck 138 of a bed (not shown). Each cut 134 includes a transversely-extending slit 140 extending inwardly from the respective surface 132, 136 and terminating in a transversely-extending cylindrical opening 142.

As described above, each of the head, thigh, and foot sections 144, 148, 150 of articulating deck 138 typically move relative to seat section 146, relative to one another, and relative to the bed as shown in FIGS. 5 and 6. Portions of sculptured foam core 94 adjacent to each of sections 144, 146, 148, 150 are configured to move with each respective section 144, 146, 148, 150. Slits 140 allow for folding movement of sculptured foam core 94 in a direction inwardly away from slits 140 as shown, for example, in FIG. 6, and openings 142 prevent the inadvertent tearing of sculptured foam core 94 when sculptured foam core 94 is folded.

Cuts 134 are positioned so that at least one of cuts 134 lies generally between the head and seat sections 144, 146, at least one of cuts 134 lies generally between the seat and thigh sections 146, 148, and at least one of cuts 134 lies generally between the thigh and foot sections 148, 150 as shown in FIGS. 5 and 6. In preferred embodiments, sculptured foam core 94 is provided with a plurality of cuts 134 at each position as shown best in FIGS. 5 and 6 so that the above holds true when sculptured foam core 94 is used with a variety of beds having articulating decks, the longitudinal lengths of the head, seat, thigh, and foot sections 144, 146, 148, 150 of which may vary from bed to bed.

As mentioned above, sculptured foam core 94 is also provided with transversely extending troughs 130 formed on top surface 132 shown best in FIGS. 5 and 6. Troughs 130 can be positioned to facilitate the folding of sculptured foam core 94 as shown in FIG. 6 by providing additional space for the surface 132, 136 opposite cuts 134 to compress upon itself. However, troughs 130 are not necessary for the portions of sculptured foam core 94 to move with the head, seat, thigh, and foot sections 144, 146, 148, 150 or articulating deck 138.

Each trough 130 is formed to include a depth 160 and a width 162 as shown best in FIGS. 5 and 6, and both of depth 160 and width 162 can be varied to vary the characteristics of support and firmness exhibited by sculptured foam core 94 adjacent to troughs 130. For example, by increasing depth 160 of troughs 130, sculptured foam core 94 adjacent to troughs 130 provides the user (not shown) with support and firmness characteristics that would be expected from a non-sculptured foam mattress having foam that is less firm than the foam comprising sculptured foam core 94. Likewise, by increasing width 162 of troughs 130, sculptured foam core 94 adjacent to troughs 130 provides the user (not shown) with support and firmness characteristics that would be expected from a non-sculptured foam mattress having foam that is less firm than the foam comprising sculptured foam core 94. Thus, by varying depth 160 and width 162 of troughs 130, the support and firmness characteristics of portions of sculptured foam core 94 can be varied.

In preferred embodiments, troughs 130 are formed in top surface 132 of sculptured foam core 94. It has been found, however, that by sculpturing troughs 130 onto the surface of sculptured foam core 94 engaging the bed so that sculptured foam core 94 presents a generally planar top surface 132 provides for decreases of the firmness and support characteristics of mattress 52 carrying sculptured foam core 94, these decreases being less than the decreases experienced when the sculptured surface faces upwardly. Thus, by sculpturing sculptured foam core 94 on the downward surface engaging the bed, the firmness and support characteristics of mattress 52 can be further adjusted. It is within the scope of the invention as presently perceived to sculpt the sculptured foam core to include troughs 130 only on top surface 132, only on the downwardly-facing surface of sculptured foam core 94 engaging the bed, and on both above-mentioned surfaces.

Figure 7:
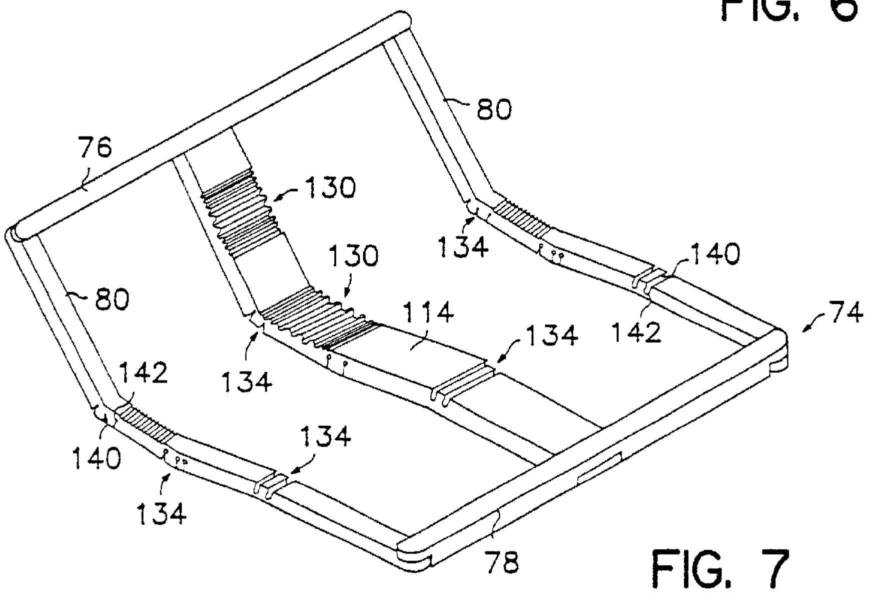
FIG. 7 is a perspective view of the frame and the foam divider of FIG. 2 showing the frame and the foam divider rail moved by an articulating deck (not shown) to a position other than the generally planar sleeping position, cuts formed in side foam sections of the frame on the surface opposite the bends and cuts formed in the foam divider rail on the surface opposite the bends allowing the frame and foam divider rail to generally conform to the shape of the deck.

Side foam sections 80 of frame 74 and foam divider rail 114 can also be sculptured to allow for each of these members 80, 114 to move as shown in FIG. 7 along with head, seat, thigh, and foot sections 144, 146, 148, 150 of articulating deck 138. Foam divider rail 114 is typically sculptured to have the same pattern of troughs 130 and cuts 134 as described above with respect to sculptured foam core 94.

In preferred embodiments, frame 74 is formed from foam having a significantly greater firmness than core 88 so that frame 74 provides additional support along the sides and ends of mattress 52. Such additional support is particularly useful when a user enters and exits the bed. However, use of such additionally firm side foam sections 80 requires that side foam sections 80 are sculptured to ensure that side foam sections 80 move with the head, seat, thigh, and foot sections 144, 146, 148, 150 of deck 138.

As with sculptured foam core 94, side foam sections 80 of frame 74 are provided with transverse cuts 134 having slits 140 and cylindrical openings 142 as shown in FIG. 7. Side foam sections 80 can also be provided with troughs 130 to vary the firmness and support characteristics of side foam sections 80 as described above with respect to sculptured foam core 94.

Core 88 can also include air bladder 96 as shown in FIGS. 1(*a*), 2, and 8(*a*)–15. Air bladder 96 is preferably inflated and deflated using air, however any acceptable fluid such as other gasses or liquids such as water and water having additives to adjust the viscosity of the resultant liquid can be used to inflate air bladder 96 without exceeding the scope of the invention as presently perceived. Thus, throughout the specification and claims such fluid will be referred to as air, although it is understood that other fluids may be used.

Air bladder 96 can be a "one-zone" air bladder (not shown) having one continuous air pocket extending through the air bladder so that the entire air bladder is uniformly inflated and deflated each time air is added to or removed from the air bladder. In preferred embodiments, however, air bladder 96 is a multiple-zoned air bladder having independently inflatable zones. Preferred and illustrative air bladder 96 is a "four-zone" air bladder 96 as shown in FIGS. 8(*a*) and 9 having independently inflatable zones including an upper back zone 192 supporting the scapula, a lower back zone 194 supporting the lumbar region, a seat zone 196 supporting the sacrum, and a foot zone 198 supporting the thighs, legs, and feet of the user.

Figure 8A:
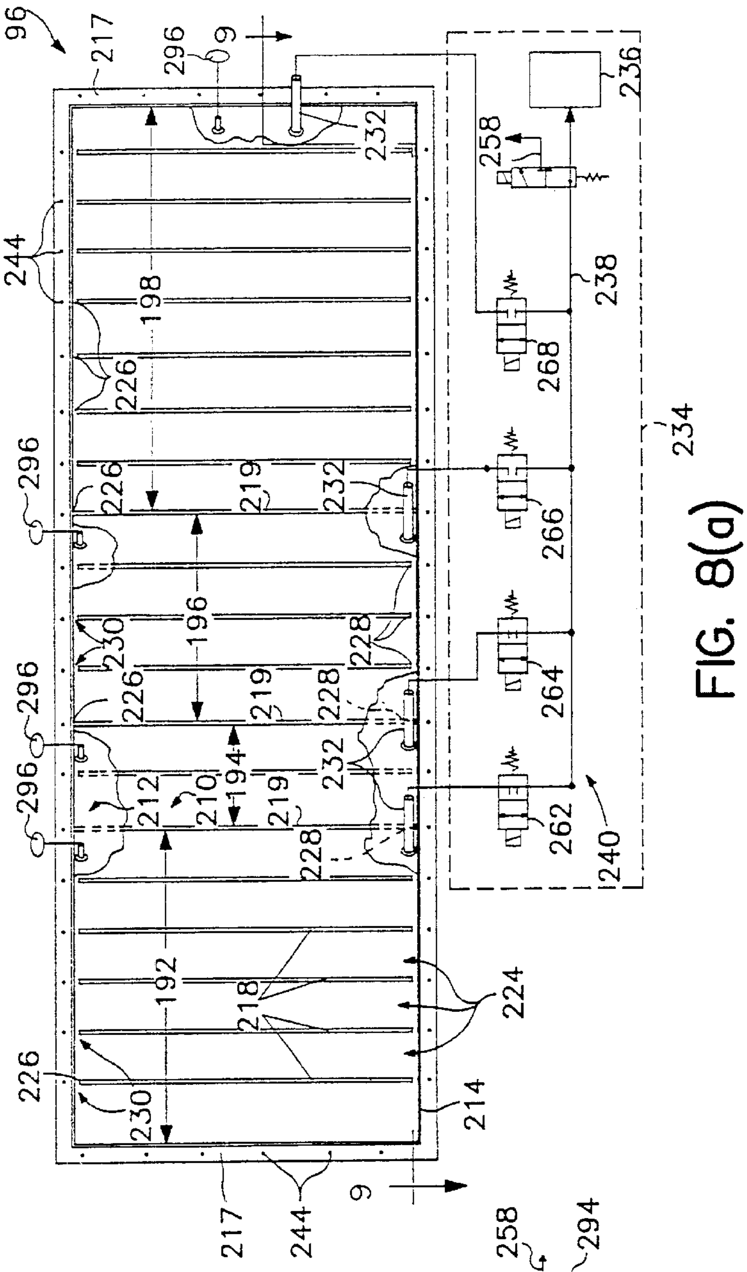
FIG. 8(*a*) is a diagrammatic bottom view of a "four-zone" air bladder and pressurized air supply with portions broken away showing the pockets formed in the air bladder by I-beams (not shown) attached to the interior of the air bladder, and showing each I-beam having first and second transverse ends, the first and second ends of a first set of I-beams being spaced-apart from the edge of the air bladder to form openings allowing fluid communication between pockets, and a diagrammatic manifold of the pressurized air supply.
Figure 8B:
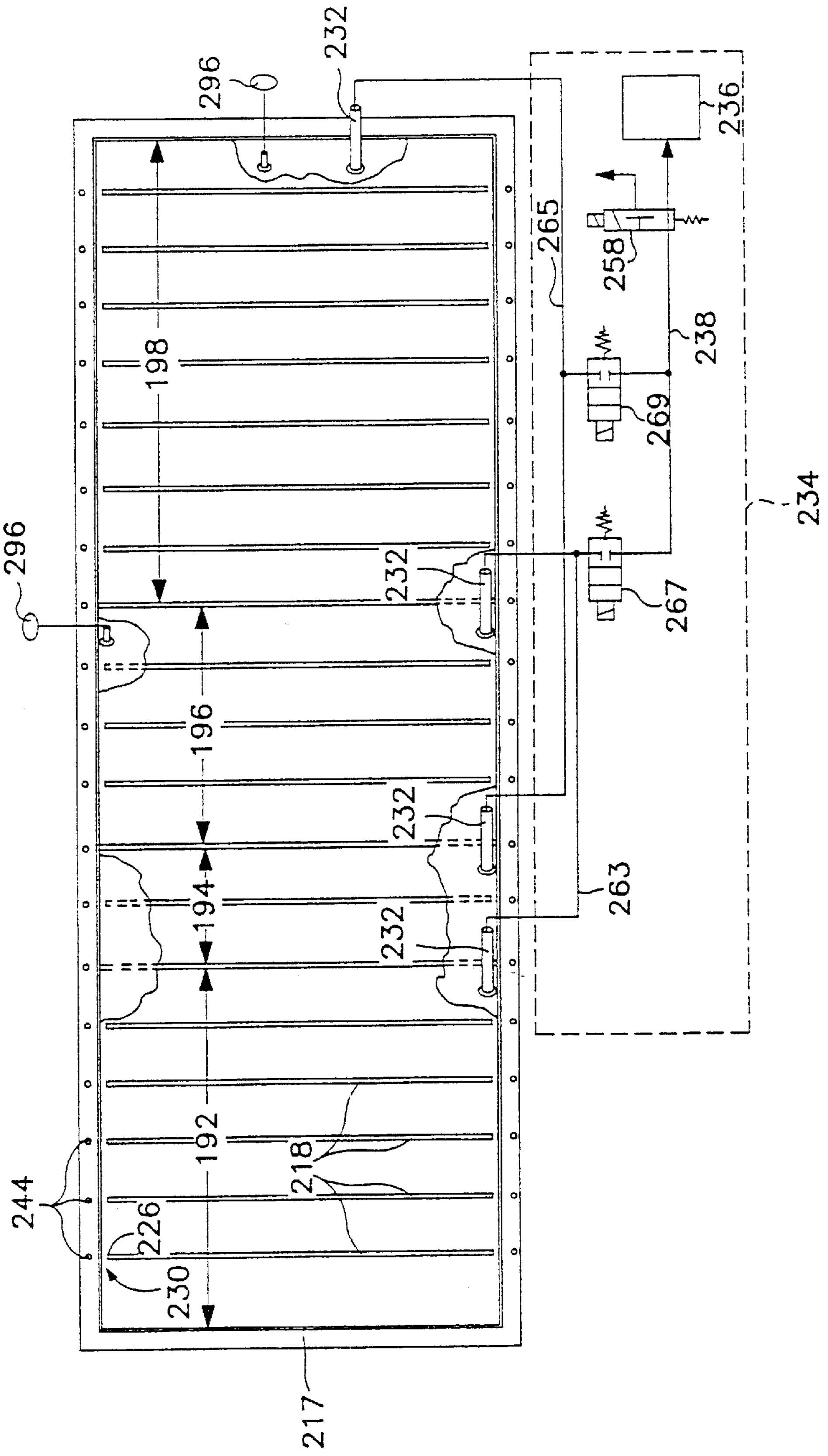

Air bladder 96 is constructed from an upper sheet 210 of an air impermeable material that is adhesively connected to a lower sheet 212 of an air impermeable material by a perimetral bead 214 of adhesive applied therebetween as shown in FIGS. 8(*a*), 8(*b*), and 9 to form an air-tight perimetral seal. Upper and lower sheets 210, 212 cooperate with bead 214 to define an internal region 216 of air bladder 96 that is air impermeable. Bead 214 is slightly spaced apart from outer edges of upper and lower sheets 210, 212 forming a two-layered perimetral flange 217.

Transversely extending I-beams 218, 219 are received inside of internal region 216 as shown in FIGS. 9 and 11–15. Each I-beam 218, 219 includes a top lip 220 sewn and adhesively attached to upper sheet 210 and a lower lip 222 sewn and adhesively attached to lower sheet 212 as shown best in FIGS. 11 and 14.

The adhesive forms an air impermeable seal between top lip 220 and upper sheet 210 and between lower lip 222 and lower sheet 212. Each I-beam 218, 219 cooperates with upper sheet 210, lower sheet 212, and each adjacent I-beam 218, 219 to define a pocket 224 so that when air bladder 96 is inflated it defines a longitudinally extending series of transverse pockets 224 as shown best in FIGS. 8(*a*), 8(*b*), 9, and 11–15. Each pocket 224 is a predetermined size when pocket 224 is inflated to its full capacity.

Each I-beam 218, 219 has a transverse first end 226 and a transverse second end 228 as shown in FIG. 8(*a*). First and second ends 226, 228 of I-beams 218 are spaced apart from bead 214 to define openings 230 in fluid communication with adjacent pockets 224 defined by I-beams 218, thereby allowing the passage of air therebetween. However, first and second ends 226, 228 of I-beams 219 are adhesively attached to bead 214 to form air impermeable seals between adjacent pockets 224 defined by I-beams 219. Thus, adjacent pockets 224 defined by I-beams 219 are not in fluid communication through I-beams 219. I-beams 219 are placed to define each of the separate and distinct upper back, lower back, seat, and foot zones 192, 194, 196, 198 of air bladder 96 as shown in FIGS. 8(*a*), 8(*b*), and 9.

Each zone 192, 194, 196, 198 is provided with a tube 232 in fluid communication with pockets 224 of each respective zone 192, 194, 196, 198, and tubes 232 are each in fluid communication with a pressurized air supply 234 as shown diagrammatically in FIG. 8(*a*). Preferred pressurized air supply 234 includes a source of compressed air 236 such as an air compressor, a pressurized air tank, or the like, a manifold 238 connecting each tube 232 to source of compressed air 236, and valves 240 individually controlling the flow of compressed air to and from each tube 232 as shown in FIGS. 1(*a*), 2, and 8(*a*). In preferred embodiments, manifold 238 is positioned to lie in an opening 243 formed in foot end foam section 78 of frame 74 as shown in FIGS. 1(*a*) and 2.

Valves 240 include a three-way normally open source/exhaust valve 260 connecting manifold 238 to source of compressed air 236 when source/exhaust valve 260 is open and connecting manifold 238 to an exhaust line 258 when source/exhaust valve 260 is energized as shown in FIGS. 8(*a*) and 8(*b*). An upper back valve 262 is a normally closed valve that connects upper back zone 192 to manifold 238 when upper back valve 262 is energized. A lower back valve 264 is a normally closed valve that connects lower back zone 194 to manifold 238 when lower back valve 264 is energized. A seat valve 266 is a normally closed valve that connects seat zone 196 to manifold 238 when seat valve 266 is energized. A foot valve 268 is a normally closed valve that connects foot zone 198 to manifold 238 when foot valve 268 is energized.

To increase the support and firmness characteristics of mattress 52 having four-zone air bladder 96 adjacent to upper back zone 192, the user energizes upper back valve 262 to bring upper back zone 192 into fluid communication with manifold 238 as shown in FIG. 8(*a*). Source/exhaust valve 260 is normally open so that when upper back zone 192 is in fluid communication with manifold 238, upper back zone 192 is also in fluid communication with source of compressed air 236 so that upper back zone 192 inflates. Likewise, to increase the firmness and support characteristics of matters 52 adjacent to lower back, seta, or foot zones 194, 196, 198, the user simply energizes lower back valve, seat valve, or foot valve 264, 266, 268 respectively to bring the respective zone 194, 196, 198 of air bladder 96 into fluid communication with source of compressed air 236. To increase the firmness and support characteristics of the entire mattress 52 simultaneously, the user simply energizes all four of the upper back, lower back, seat, and foot valves 262, 264, 266, 268 simultaneously to bring all four zones 192, 194, 196, 198 into fluid communication with source of compressed air 236 at the same time.

To decrease the support and firmness characteristics of mattress 52 having four-zone air bladder 96 adjacent to upper back zone 192 to provide the user with a more plush feel, the user energizes source/exhaust valve 260 to bring manifold 238 into fluid communication with exhaust line 258 as shown in FIGS. 8(*a*) and 8(*b*), and then energizes upper back valve 262 to bring upper back zone 192 into fluid communication with manifold 238. Typically, exhaust line 258 vents directly to the atmosphere, so that energizing both source/exhaust valve 260 and upper back valve 262 brings upper back zone 192 into fluid communication with the atmosphere, causing upper back zone 192 to deflate and providing mattress 52 with a more plush feel for the user.

Likewise, to decrease the firmness and support characteristics of mattress 52 adjacent to lower back, seat, or foot zones 194, 196, 198, the user simply energizes lower back valve, seat valve, or foot valve 264, 266, 268 respectively to bring the respective zone 194, 196, 198 of air bladder 96 into fluid communication with manifold 238, and thus the respective zone 194, 196, 198, and at the same time energizes source/exhaust valve 258 to bring manifold 238, and thus the respective zone 194, 196, 198, into fluid communication with exhaust line 258 as shown in FIGS. 8(*a*) and 8(*b*). To decrease the firmness and support characteristics of the entire mattress 52 simultaneously, the user simply energizes all five of the upper back, lower back, seat, foot, and source/exhaust valves 262, 264, 266, 268, 260 simultaneously to bring all four zones 192, 194, 196, 198 into fluid communication with exhaust line 258 at the same time so that all four zones 192, 194, 196, 198 simultaneously vent to the atmosphere.

If desired, manifold 238 and valves 240 can be rearranged to "link" the performance of separate zones of four zone air bladder 96 as shown in FIG. 8(*b*). For example, tube 232 communicating with upper back zone 192 can also be brought into fluid communication with tube 232 communicating with seat zone 196 by connector tube 263 communicating with both upper back zone 192 and seat zone 196. Connector tube 263 can be brought into fluid communication with source of compressed air 236 through an upper back and seat valve 267 and manifold 238 so that both upper back and seat zones 192, 196 are inflated generally simultaneously and to the same extent to increase the firmness and support characteristics of these zones 192, 196 of mattress 52. Connector tube 263 can also be brought into fluid communication with exhaust line 258 to simultaneously and to the same extent deflate both upper back and seat zones 192, 196, and decrease the firmness and support characteristics of mattress 52 accordingly.

As can be seen, any two or more of zones 192, 194, 196, 198 can be linked by a connector tube to cause separate portions of mattress 52 to provide similar firmness and support characteristics. Likewise, a second connector tube 265 can be formed to bring tubes 232 not connected to the first common line into fluid communication. For example, if upper back and seat zones 192, 196 are in fluid communication through connector tube 263, tube 232 communicating with lower back zone 194 can be brought into fluid communication with tube 232 communicating with foot zone 198 by second connector tube 265 so that lower back zone 194 is in fluid communication with foot zone 198. By bringing second connector tube 265 into fluid communication with source of compressed air 236, both lower back and foot zones 194, 198 will simultaneously inflate, increasing the firmness and support characteristics of mattress 52 adjacent to lower back and foot zones 194, 198 at the same time and to the same extent. Likewise, by bringing the second connector tube 265 into fluid communication with exhaust line 258, the firmness and support characteristics of mattress 52 adjacent to lower back and foot zones 194, 198 will decrease generally simultaneously and generally to the same extent. Thus, independent zones of air bladder 96 can be linked so that the support and firmness characteristics of mattress 52 adjacent to the linked zones change at the same time to the same extent when adjusted by the user.

In preferred embodiments of mattress 52 having four-zone or one-zone air bladder 96, the pressure of each zone 192, 194, 196, 198 can be automatically controlled by placing air bladder 96 into "computer" mode. Once a user establishes a desired pressure for each zone 192, 194, 196, 198 that results in the desired firmness and support characteristics, the pressure in one or more of the zones 192, 194, 196, 198 can change. For example, if the user moves so that a heavier or lighter portion of the user's body is supported by the affected zone, the pressure in the affected zone will change, changing the firmness and support characteristics of the affected zone.

Each zone 192, 194, 196, 198 of air bladder 96 is provided with a transducer 296 for providing an output signal in response to the pressure of each respective zone 192, 194, 196, 198 so that the pressure in each zone 192, 194, 196, 198 can be monitored, and bed and mattress structure 50 can be configured to compensate for these changes in pressure. For example, if the pressure in upper back zone 192 decreases from a set point established by the user, upper back valve 262 can be automatically energized to bring upper back zone 192 into fluid communication with source of compressed air 236 until the pressure in upper back zone 192 increases back to the set point, thus increasing the firmness and support characteristics of mattress 52 to the selected level. Likewise, if the pressure in seat zone 196 increases above the set point established by the user, seat valve 266 and source/exhaust valve 260 can be automatically energized to bring seta zone 196 into fluid communication with exhaust line 258, deflating seta zone 196 until the pressure is reduced back to the set point, thus returning the support and firmness characteristics of mattress 52 adjacent to seat zone 196 to the selected level. By monitoring and adjusting the pressure in each zone 192, 194, 196, 198 of air bladder 96, the user's selected support and firmness characteristics can be maintained.

When mattress 52 is sized for a king- or queen-sized bed as shown in FIG. 2 and core 88 includes two side-by-side air bladders 96, one source of compressed air 236 can be used to inflate and deflate both air bladders 96. Typically, each air bladder 96 is provided with manifold 238 and valves 240, with each source/exhaust valve 260 being in fluid communication with a "T-connector" (not shown) bringing each source/exhaust valve 260 into fluid communication with source of compressed air 236.

As described above, both air bladders 96 can operate in a "computer" mode wherein the pressure of each respective zone 192, 194, 196, 198 is maintained by automatically inflating and deflating each zone to compensate for movement of the user that changes the load carried by each respective zone. The above-described valve configuration in accordance with the present invention prevents a "continuous run" condition. A continuous run condition is present in side-by-side air bladders 96, both of which are on computer mode, when one air bladder 96 is exhausting so that one manifold 238 is in fluid communication with exhaust line 258 at the same time the other air bladder 96 is inflating so that the other manifold 238 is in fluid communication with source of compressed air 236. Since both manifolds 238 are connected by the T-connector, the possibility exists that compressed air source 236 might be in fluid communication with exhaust line 258 so that neither air bladder 96 reaches the desired state, causing the system to run continuously as it attempts to inflate and deflate each air bladder.

However, each source/exhaust valve 260 is a three-way valve that positively blocks the flow between exhaust line 258 and manifold 238 when source/exhaust valve 260 is open to bring manifold 238 into fluid communication with source of compressed air 236. In addition, source/exhaust valve 260 blocks the flow from source of compressed air 236 when source/exhaust valve 260 is energized to bring manifold 238 into fluid communication with exhaust line 258. Thus, use of a three-way valve for source/exhaust valve 260 eliminate the possibility of inadvertently achieving a continuous run condition when operating two side-by-side air bladders.

Figure 10:
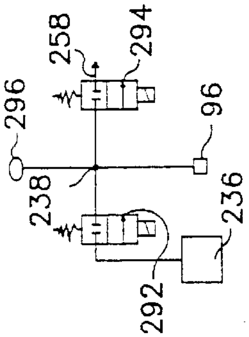
FIG. 10 is a schematic view of a valve manifold for a one-zone air bladder showing a compressed air line, an exhaust line, an air line in fluid communication with the interior region of the air bladder, and a transducer for transducing a pressure measurement to an electronic output signal.

The operation of a one-zone air bladder 96 as shown in FIG. 10 is simpler than the operation of four-zone air bladder 96. An inlet valve 292 is normally open to block the fluid communication between source of compressed air 236 and manifold 238. Likewise, an exhaust valve 294 is normally closed to block the fluid communication between exhaust line 258 and manifold 238. Manifold 238 is in fluid communication with air bladder 96 and a transducer 296 for converting a measured pressure to an output signal for use by a controller 370 is in fluid communication with air bladder 96 through manifold 238. To increase the firmness and support characteristics of mattress 52 having one-zone bladder 96, user simply energizes inlet valve 292 to restore fluid communication between source of compressed air 236 and air bladder 96 through manifold 238 to inflate air bladder 96. To decrease the firmness and support characteristics of mattress 52, user energizes exhaust valve 294 to restore fluid communication between exhaust line 258 and air bladder 96 through manifold 238 to deflate air bladder 96.

Figure 9:
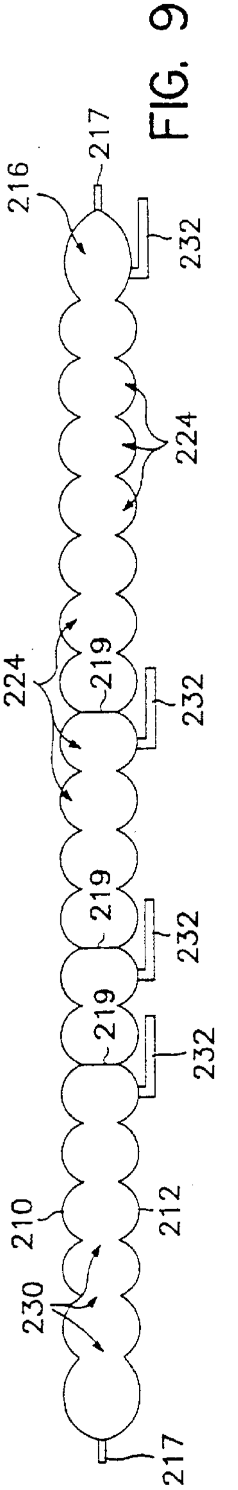
FIG. 9 is a diagrammatic illustration of a sectional view taken along line 9—9 of FIG. 8(*a*) showing the four-zone air bladder having pockets separated by I-beams with the selected I-beams defining the zones of the air bladder, the ends of a second set of I-beams sealingly engaging the edge of the air bladder to separate pockets adjacent to the I-beams to form separate and independently inflatable and deflatable zones of the air bladder.

I-beams 218, 219 are generally of similar height so that pockets 224 are generally uniform in size and shape as shown in FIG. 9. The height of I-beams 218, 219 can be varied as shown in FIGS. 11–14 for I-beams 218' which are taller than I-beams 218, 219 to produce pockets 224' defined by I-beam 218' that inflate to a size larger than pockets 224 that are not adjacent to I-beam 218'. Pockets 224' produce a portion on mattress 52 adjacent to pockets 224' at which the user perceives additional support and firmness. By placing I-beam 218' as shown in FIGS. 11–15, air bladder 96 will provide additional support and firmness for the lumbar portion of the user's adjacent to the lower back zone 194.

Typically, I-beams 218, 219 are generally the same height so that pockets 224 are generally uniform in size and shape as shown in FIG. 9. Air bladder 96 can be made, however, having selected I-beams 218' which are taller than I-beams 218, 219 as shown in FIGS. 11-15 to produce pockets 224' defined by taller I-beams 218' that inflate to a size larger than pockets 224 defined only by I-beams 218, 219 so that upper and lower sheets 210, 212 adjacent to pockets 224' project beyond upper and lower sheets 210,.212 adjacent to pockets 224 defined only by I-beams 218, 219 when pockets 224, 224' are fully inflated, as shown best in FIG. 15. By including isolated pockets 224' that project past the other surfaces of air bladder 96, mattress 52 provides additional firmness and support characteristics at longitudinal zones adjacent to projecting pockets 224'.

Figure 11:
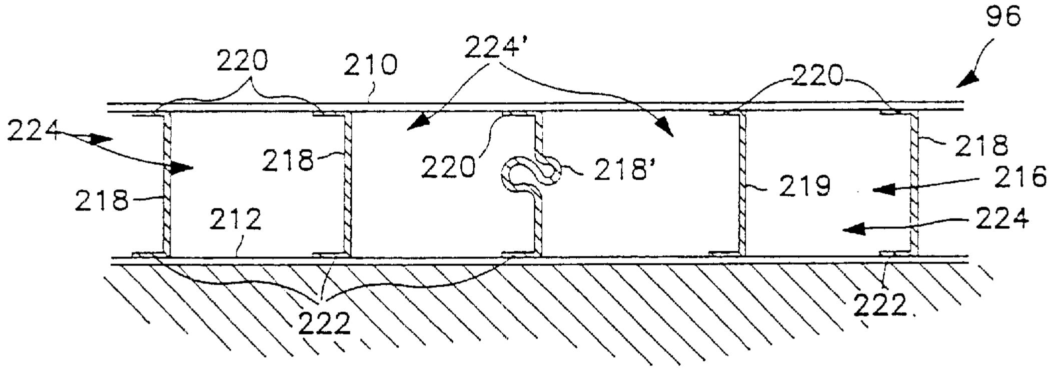
FIG. 11 is a diagrammatic sectional view of the bladder of FIG. 8(*a*) showing an interior region of the partially inflated air bladder including I-beams of generally uniform height with one I-beam being significantly taller than the remaining I-beams.
Figure 12:
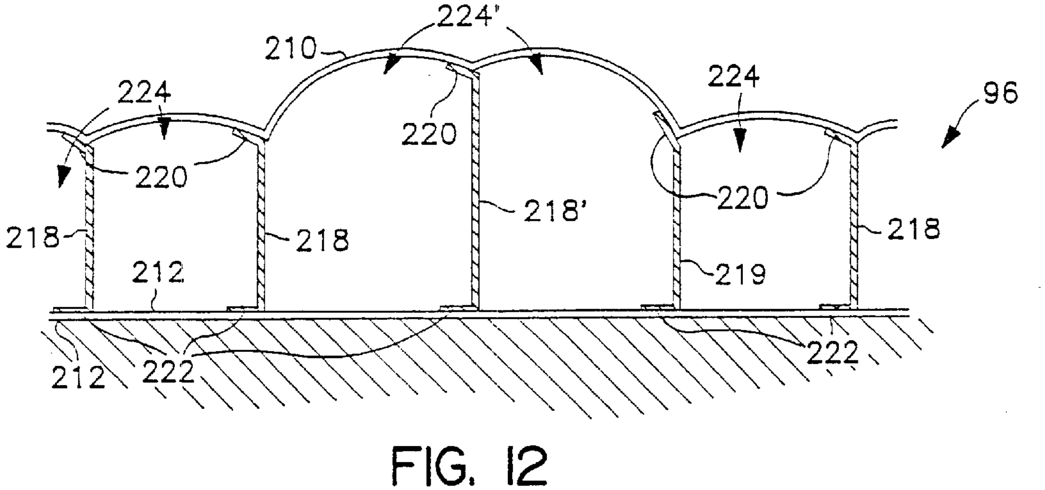
FIG. 12 is a view similar to FIG. 11 showing the air bladder fully inflated so that the air bladder adjacent to the pockets defined by the significantly taller I-beam-project above the air bladder adjacent to the other pockets so that the mattress adjacent to the projecting pockets provides a user with additional support and firmness.
Figure 14:
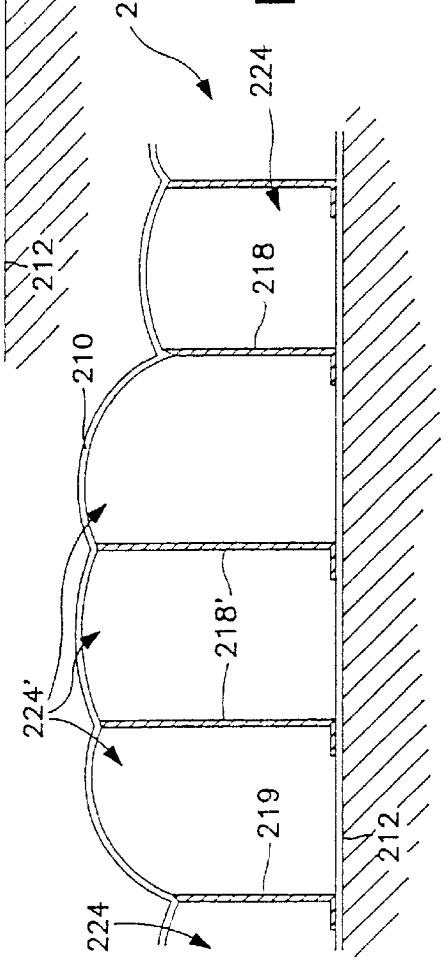
FIG. 14 is a view similar to FIG. 13 showing the air bladder fully inflated so that the air bladder adjacent to the pockets defined by the significantly taller I-beams project above the air bladder adjacent to the other pockets so that the mattress adjacent to the projecting pockets provides a user with additional support and firmness.

For example, a single I-beam 218' can be positioned to lie between two I-beams 218, 219 as shown diagrammatically in FIGS. 11 and 12 for air bladder 96 resting on a generally planar surface. When air bladder 96 is fully inflated, upper sheet 210 adjacent to two adjacent pockets 224, which are both defined in part by I-beam 218', projects above upper sheet 210 adjacent to pockets 224 as shown in FIG. 11. Likewise, two adjacent I-beams 218' can be positioned to lie between I-beams 218, 219 as shown diagrammatically in FIGS. 13 and 14 for air bladder 96 resting on a generally planar surface. When air bladder 96 is fully inflated, upper sheet 210 adjacent to three adjacent pockets 224', each of which are defined at least in part by I-beams 218', projects above upper sheet 210 adjacent to pockets 224 as shown in FIG. 14. Although only one and two adjacent I-beams 218' that are taller than I-beams 218, 219 are shown in FIGS. 11–15, the height of any number of adjacent I-beams 218' may be varied to cause a desired portion of upper and lower sheets 210, 212 of air bladder 96 to project beyond the remaining portions of upper and lower sheets 210, 212.

Figure 15:
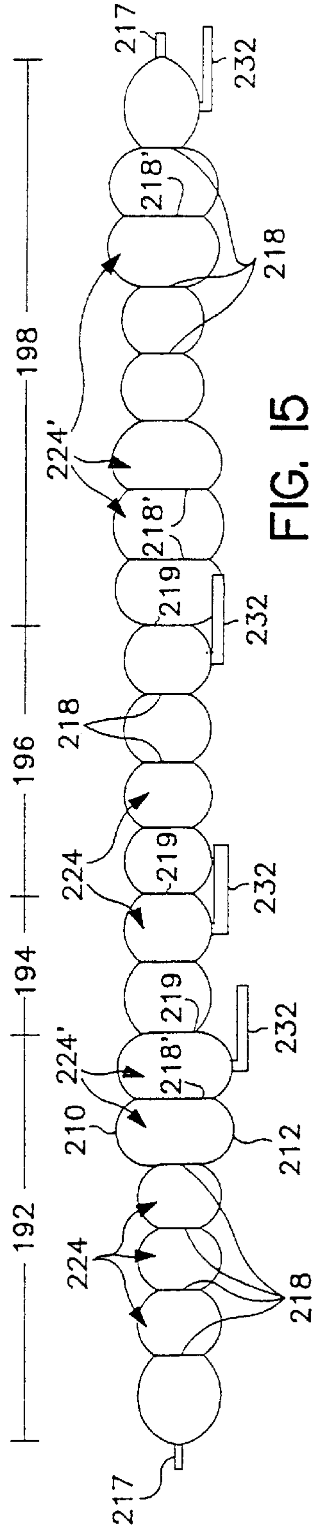
FIG. 15 is a view similar to FIG. 9 showing the air bladder having a plurality of significantly taller I-beams so that the air bladder adjacent to pockets adjacent to the lumbar region of the user, pockets adjacent to the thigh of the user, and pockets adjacent to the heel of the user project above the air bladder adjacent to the other pockets to provide a user with additional support and firmness near portions of the-mattress adjacent to the projecting pockets and to provide additional pressure relief to the heels of the user.
Figure 17:
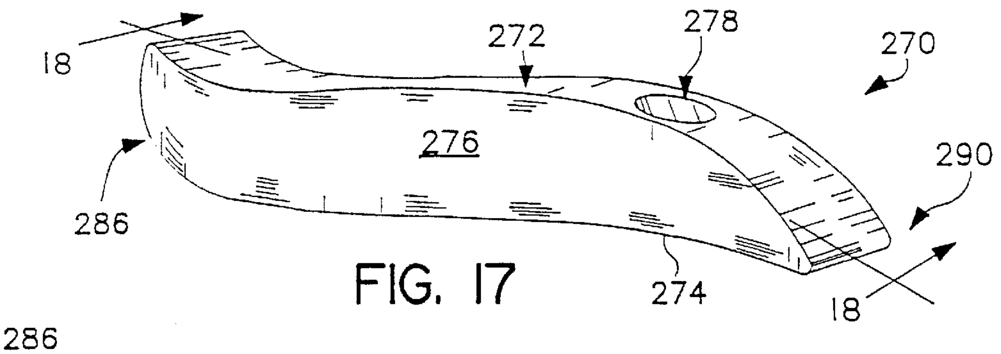
FIG. 17 is a perspective view of an arm rest in accordance with the present invention showing the foam interior of the arm rest.
Figure 18:
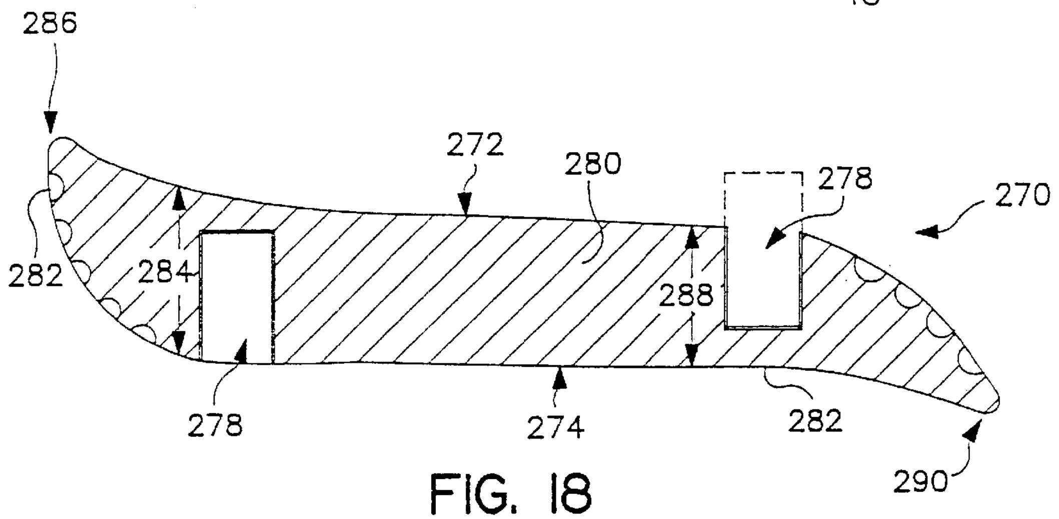
FIG. 18 is a sectional view of taken along line 18—18 of FIG. 17 showing a cover surrounding the arm rest and showing a cup (in phantom) received in a cup holder formed in the arm rest.

Taller I-beams 218' can be used to provide firmness and support characteristics that vary longitudinally along mattress 52 including air bladder 96 as shown in FIG. 15, even if air bladder 96 is a one-zone air bladder. In addition, use of taller I-beams 218' can cause each zone of a multiple zone air bladder 96 to provide mattress 52 with multiple firmness and support characteristics adjacent to the zone.

For example, I-beams 218' can be used to form pockets 224' in foot zone 198 adjacent to seat zone 196 as shown in FIG. 15. Mattress 52 including air bladder 96 with such pockets 224' will provide the user with additional firmness and support adjacent to his or her thighs. Thus foot zone 198, which includes pockets 224, 224' that are all in fluid communication so that the air pressure in each pocket 224, 224' of foot zone 198 is generally equivalent, will simultaneously provide the portion of mattress 52 adjacent to foot zone 198 with multiple firmness and support characteristics.

For another example, I-beams 218' can be used to form pockets 224' in foot zone 198 adjacent to the ankles of the user as shown in FIG. 15. Mattress 52 including air bladder 96 with such pockets 224' will provide the user with additional firmness and support adjacent to his or her ankles. In addition, by providing this additional support adjacent to the ankles of the user, mattress 52 will operate to relieve interface pressure against the heels of the user to help alleviate pressure ulcers that can develop on the heels of the user. Air bladder 96 can thus be used to adjust the support and firmness characteristics of mattress 52 both by having adjustable air pressure in one or multiple longitudinal zones, for example zones 192, 194, 196, 198, and by suing I-beams 218' that are taller than other I-beams 218, 219 so that portions of upper and lower sheets 210, 212 of air bladder 96 project beyond portions of upper and lower sheets 210, 212 adjacent only to I-beams 218, 219.

Flange 217 of air bladder 96, which is positioned to lie outside of perimetral bead 214 as shown in FIGS. 8(*a*), 8(*b*), and 9, is formed from outer, portions of both the upper and lower sheets 210, 212. Flange 217 is formed to include a plurality of spaced-apart openings 244 that extend therethrough. Openings 244 are used during the manufacturing process to stabilize air bladder 96 as manufacturing operations are performed thereon.

Openings 244 can also be used, however, to stabilize air bladder 96 in mattress 52. For example, when mattress 52 is provided for a queen-sized bed (not shown) so that core 88 includes elements in side-by-side abutting engagement, if core 88 includes side-by-side air bladders 96, then openings 244 of the first air bladder 96 can be tied to openings 244 of the second air bladder 96 to prevent relative transverse movement of the first air bladder 96 relative to the second air bladder 96. Even if core 88 includes side-by-side elements only one of which is an air bladder 96, openings 244 can still be used to stabilize air bladder 96 if desired.

Figure 16:
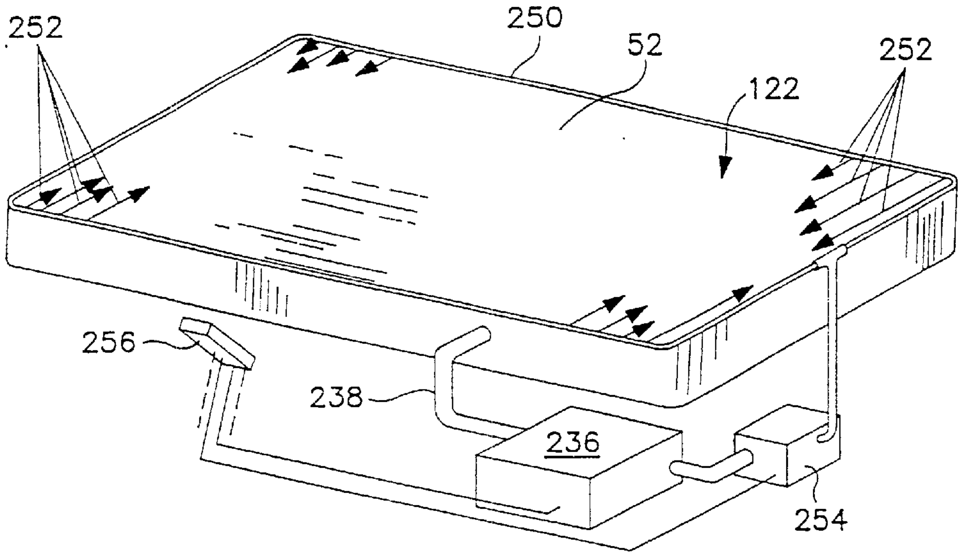
FIG. 16 is a view of the mattress of FIGS. 1(*a*) and 2 showing an air supply providing pressurized air to an air bladder inside of the mattress and to an enclosed channel formed along the perimeter of the upwardly-facing sleeping surface of the mattress and an air heater interposed between the air supply and the channel to heat the air received by the channel, the material enclosing the channel being formed to include small openings that direct a small volume of air from the channel across the sleeping surface to warm or cool the user.
Figure 13:
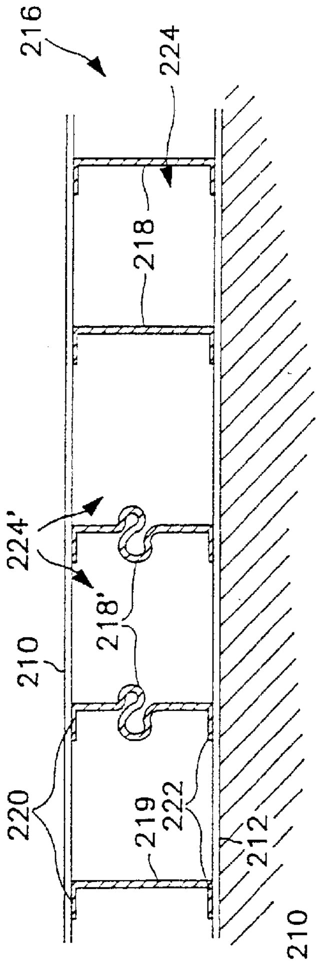
FIG. 13 is a sectional view taken along line 13—13 of FIG. 8(*a*) showing an interior region of the partially inflated air bladder including I-beams of generally uniform height with two I-beams being significantly taller than the remaining I-beams.

In preferred embodiments of bed and mattress structure 50, top cover 60 of mattress 52 can be formed to include an enclosed "warm air release" channel 250 receiving air from source of compressed air 236 as shown in FIG. 16. Enclosed channel 250 is preferably made from a light weight and air impermeable material so that air is directed along the length of channel 250. The material is formed to include small openings (not shown) that allow a small amount of air to escape from channel 250. The openings direct the air across the surface of mattress 52 as shown by arrows 252 in FIG. 12.

An air heater 254 is interposed between source of compressed air 236 and channel 250 as shown in FIG. 16 so that heated air can be provided to channel 250. Air heater 254 can be selectively operated so that when air heater 254 is operating, air 252 is the warm air release warming the user and particularly warming the extremities of the user. When air heater 254 is not operating, air 252 is a room temperature air release cooling the user during operation of channel 250. Of course, in preferred embodiments, a valve is positioned between source of compressed air 236 and channel 250 so that channel 250 can be operated or not operated at the discretion of the user.

Channel 250 can be positioned about the perimeter of top cover 60 as shown in FIG. 16. As mentioned above, the preferred material of construction of much of mattress 52 is foam rubber which is a thermal insulator. As such, it is important that channel 250 be as close as possible to sleeping surface 122 and the user. As a result, if mattress 52 includes pillow top 90, then channel 250 can be formed around an outer edge of pillow top 90 rather than top cover 60 so that channel 250 is adjacent to sleeping surface 122.

Also in preferred embodiments, a hand held controller 256 is provided for use by the user as shown in FIG. 16 for controlling the operation of bed and mattress structure 50. Hand held controller 256 can operate both source of compressed air 236 and air heater 254 as well as other mattress functions as described in detail below with reference to FIGS. 21 and 22.

Bed and mattress structure 50 can additionally be provided with arm rests 270 as shown in FIGS. 17–20. Arm rest 270 includes a curved top surface 272, a curved bottom surface 274, and generally planar sides 276. Top and bottom surfaces 272, 274 can each be formed to include openings 278 sized to receive drinking glasses, drinking cups, beverage cans, or the like (shown in phantom in FIG. 18). The preferred arm rest 270 includes a foam rubber pad 280 and a fabric covering 282 conformingly shaped to fit around pad 280 as shown best in FIG. 18. Top and bottom surfaces 272, 274 are spaced apart by a first distance 284 near a first end 286 of arm rest 270 and taper together so that top, and bottom surfaces 272, 274 are spaced apart by a second distance 288 near a second end 290 of arm rest 270.

Figure 19:
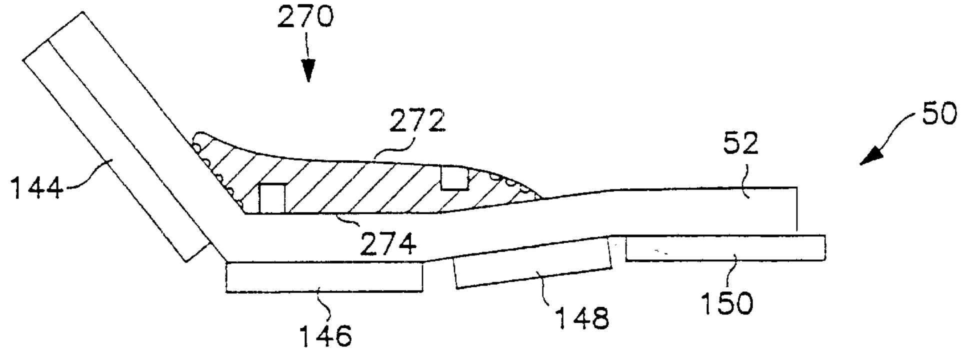
FIG. 19 is a view similar to FIG. 18 showing a bed having an articulated deck moved to a position away from the generally planar sleeping position, a mattress received on the deck, and the arm rest in a first orientation.
Figure 20:
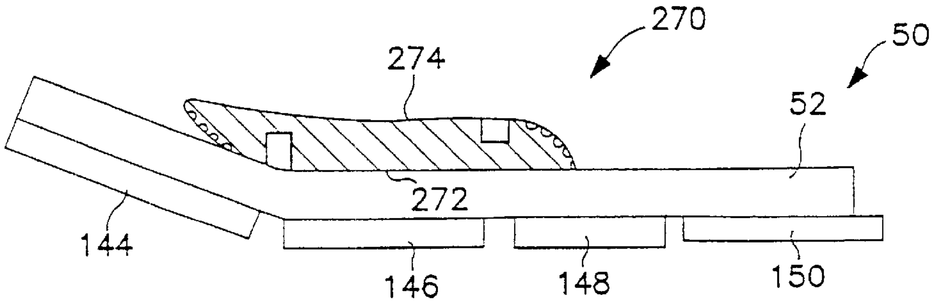
FIG. 20 is a view similar to FIG. 19 showing the deck moved to a different position away from the generally planar sleeping position, the mattress on the deck, and the arm rest in a second orientation.

Arm rest 270 is positioned between the elbow of the user (not shown) and sleeping surface 122. The distance between the elbow and sleeping surface 122 vanes somewhat between users resting on sleeping surface 122. By moving arm rest 270 longitudinally relative to the elbow of the user, most users will find a position on arm rest 270 having a distance between top and bottom surfaces 272, 274 at which the user can comfortably rest his or her elbow. If the user finds that it is most comfortable to rest his or her elbow nearer to first end 286 than to second end 290, the user will most likely prefer to use arm rest 270 with top side 272 facing upwardly as shown in FIG. 19 so that upwardly-facing opening 278 is on the portion of arm rest 270 extending longitudinally away from seat section 146. Conversely, if the user finds that it is most comfortable to rest his or her elbow nearer to second end 290 than to first end 286, the user will most likely prefer to use arm rest 270 with bottom side 274 facing upwardly as shown in FIG. 20 so that once again upwardly-facing opening 278 is on the portion of arm rest 270 extending longitudinally away from seat section 146. It can be seen in each instance that the shapes of top and bottom surfaces 272, 274 generally conform to the shape of sleeping surface 122 of mattress 52 when deck 138 is articulated away from the generally planar sleeping position.

Figure 22:
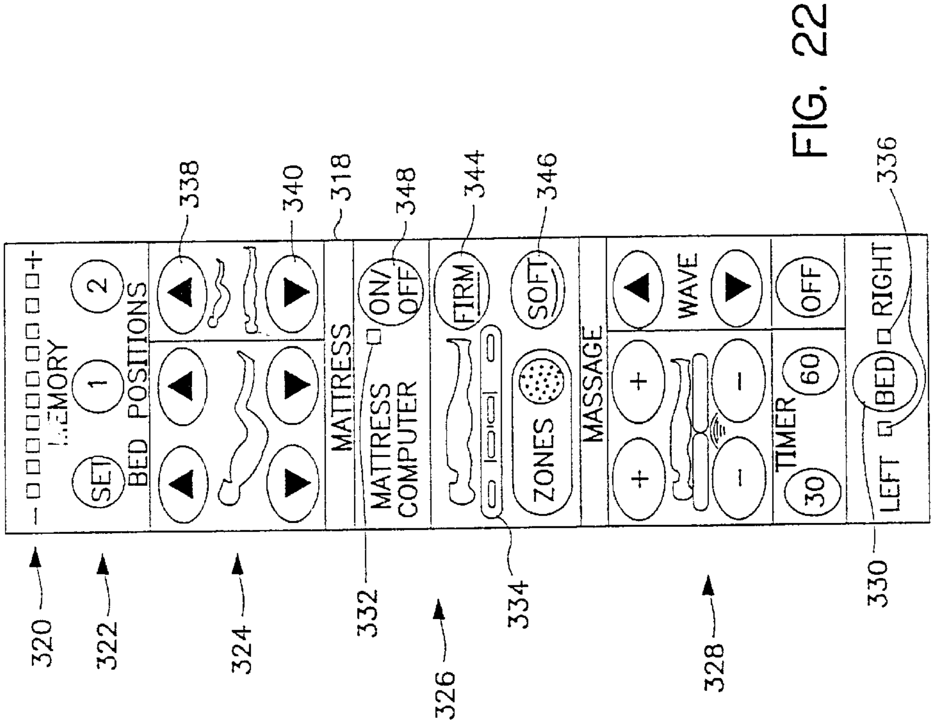
FIG. 22 is a plan view of a portion of the hand held controller of FIG. 21 showing the indicia on the hand held controller and showing "bed position buttons" on a first end, the buttons being arranged in a "use-frequency arrangement" having the most frequently used buttons positioned to lie adjacent to the first end, the least frequently used buttons positioned to lie adjacent to the second end which is opposite the first end, and the remaining buttons positioned to lie therebetween arranged in order of the frequency of use with the more frequently used buttons being positioned closer to the first end than the less frequently used buttons.
Figure 21:
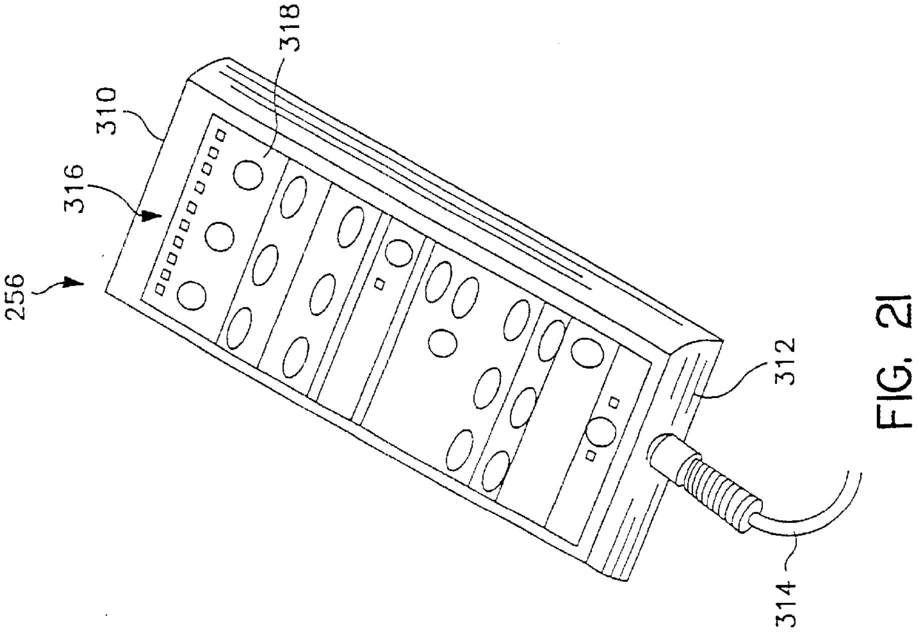
FIG. 21 is a perspective view of the hand held controller of FIG. 16 for controlling the positions of the articulating portions of the articulating deck of the bed, controlling the pressure of air in the four zones of the bladder, and for pre-setting in memory air pressures selected by the user corresponding to deck positions selected by the user so that by pressing a single button the deck will adjust to the preselected position and the bladder will adjust pressures in the four zones to the preselected pressures.

As mentioned above, hand held controller 256 is provided as shown in FIGS. 16, 21, and 22 for controlling the operation of bed and mattress structure 50. Hand held controller 256 includes a first end 310, a second end 312, a power and communication cord 314 extending away from second end 312 and toward bed and mattress structure 50, an upper face 316, and a key pad 318 carried on upper face 316 for receiving inputs from the user, bed and mattress structure 50 adjusting its various features in response to the inputs from keypad 318 as described below. When the user is holding hand held controller 256 to operate bed and mattress structure 50, hand held controller 256 will typically be held in a generally upright orientation as shown in FIG. 21 having first end 310 positioned to lie generally above second end 312.

Illustrative key pad 318 includes a light emitting diode (LED) primary display 320, memory buttons 322, bed position buttons 324, mattress control buttons 326, massage control buttons 328, and a bed select button 330 as shown in FIG. 22. In addition, key pad 318 includes an LED computer on/off display 332, an LED zone display 334, and an LED bed select display 336. As described below, illustrative key pad 318 is configured for use with a king- or queen-sized bed having an articulating deck 138 and having at least one four-zone air bladder 96. Other beds having other features would include hand held controller 256 having a key pad 318 including at least some of these buttons.

Key pad 318 is arranged so that primary display 320 is positioned adjacent to first end 310 of key pad 318 as shown in FIG. 22. The remaining buttons and displays are positioned to lie in longitudinally spaced-apart relation between primary display 320 and second end 312. Memory buttons 322 are positioned adjacent to primary display 320, bed position buttons 324 are positioned adjacent memory buttons 322, mattress control buttons 326 are positioned adjacent bed position buttons 324, massage control buttons 328 are positioned adjacent mattress control buttons 326, and bed select button 330 is positioned adjacent massage control buttons 328 and adjacent second end 312 of key pad 318.

Memory buttons 322 provide the user with the ability to establish one or more preferred "memory positions" of articulating deck 138. In addition, the memory positions include a corresponding air pressure in zones 192, 194, 196, 198 of air bladder 96 selected by the user to provide selected firmness and support characteristics to correspond to each preferred position of articulating deck 138, as shown in FIG. 22 in which illustrative key pad 318 allows the user to establish two memory positions. Once the user establishes the memory positions, the user simply presses the memory button corresponding to the desired position and articulating deck 138 will automatically move to its prescribed position while each zone 192, 194, 196, 198 of air bladder 96 is automatically inflated or deflated to its prescribed pressure so that mattress 52 provides the preselected firmness and support characteristics selected by the user to correspond to the selected position of articulating deck 138.

Bed position buttons 324 allow the user to manipulate the articulating sections of articulating deck 138. In addition, certain of the individual LEDs of primary display 320 will be energized to indicate the relative position of articulating deck 138. In addition, primary display 320 indicates the relative air pressure in zones 192, 194, 196, 198 of air bladder 96. Primary display 320 will provide an indication for the last button pressed. If more than one function is rung one time or if memory buttons 322 are pressed, primary display 320 will indicate the relative position of head section 144 of deck 138. Also, bed position buttons 324 include a preset "lounge" button 338 and a preset "bed flat" button 340 which are additional memory keys that are set during assembly of mattress 52 in accordance with inputs from the customer profile sheet.

Mattress control buttons 326 shown in FIG. 22 include a "zones" button 342 for selecting a zone 192, 194, 196, 198 of air bladder 96 in response to user pressing zones button 342, zone display 334 including LED indicators, one of which will be energized to indicate the selected zone 192, 194, 196, 198, a "firm" button 344 for increasing the air pressure in the selected zone in response to user pressing firm button 344 to increase the firmness of mattress 52 adjacent to the selected zone, and a "soft" button 346 for decreasing the air pressure in the selected zone in response to user pressing soft button 346 to decrease the firmness of mattress 52 adjacent to the selected zone. As described above, when the user presses zones button 342 to select a selected zone, primary, display 320 will indicate the relative air pressure in the selected zone.

In addition, mattress control buttons 326 include a mattress computer on/off button 348. Once a user has selected a desired air pressure for each zone 192, 194, 196, 198, the user may move relative to air bladder 96. As the user moves, heavier or lighter body parts of the user may be supported by each respective zone 192, 194, 196, 198 than were support by the zone when the desired air pressure was originally selected. If the -amount of air in zones 192, 194, 196, 198 were fixed, this movement of user could change the forces exerted on each zone 192, 194, 196, 198, thus changing the air pressure in each zone and the support and firmness characteristics of mattress 52 adjacent to each zone 192, 194, 196, 198.

Mattress 52 preferably includes transducers 296, described above with reference to FIGS. 8(*a*), 8(*b*), and 10, for measuring the air pressure in each zone 192, 194, 196, 198. If, after selecting the desired firmness and support characteristics for each zone 192, 194, 196, 198 the user presses computer on/off button 348 to turn on the "computer mode," an internal computer will monitor output signals provided from each transducer 296 in response to the air pressure in each zone 192, 194, 196, 198 and will automatically operate valves 240 when necessary and in the manner described above with reference to FIGS. 8(*a*) and 8(*b*) to maintain the pressure in each respective zone 192, 194, 196, 198 at a set point that corresponds to the firmness and support characteristics chosen by the user. If computer mode is turned on, the LED of computer on/off display 332 will be energized to indicate such status.

Mattress 52 can also be provided with a massage feature. The presently preferred massage feature is provided by first and second motors (not shown), the first motor being attached to articulating deck 138 adjacent to head section 144 and the second motor being attached to articulating deck 138 adjacent to foot section 150. Each motor rotates a generally horizontally extending shaft. An off-center weight is fixed to each shaft so that as each shaft rotates, each shaft, each motor, and deck 138 adjacent to each motor vibrates. To increase the level of vibration felt by the user, the rotation speed of the shafts is increased and to decrease the level of vibration felt by the user, the rotation speed of the shaft is decreased.

As mentioned above, mattress control buttons 326 include massage control buttons 328, including head end massage increase button 350, head end massage decrease button 352, foot end massage increase button 354, foot end massage decrease button 356, and wave buttons 358. When the user presses head end massage increase button 350, the motor attached to articulating deck 138 adjacent to head section 144 increases the rotational speed of its shaft until a maximum rotational speed is reached at which point the rotational speed of the shaft cannot be further increased.

When the user presses head end massage decrease button 352, the motor attached to articulating deck 138 adjacent to head section 144 decreases the rotational speed of its shaft until a minimum rotational speed is reached. The motor will halt the rotation of the shaft if head end massage decrease button 352 is pressed when the shaft is rotating at the minimum rotational speed. Likewise, pressing foot end massage increase button 354 and foot end massage decrease button 356 causes the motor attached to articulating deck 138 adjacent to foot section 150 to increase and decrease the rotational speed of its shaft. Pressing wave buttons 358 causes the motors to operate together to provide a coordinate massage effect.

Finally, if mattress 52 is for a queen- or king-sized bed having side-by-side air bladders 96, hand held controller 256 will control both halves of bed and mattress structure 50. Pressing bed select button 330, shown in FIG. 22, will toggle between the two halves of the bed and mattress structure 50 so that when the "left" LED of bed select display 336 is energized control inputs from the user to key pad 318 will operate to manipulate the left side of bed and mattress structure 50, and when the "right" LED of bed select display 336 is energized, control inputs from the user to key pad 318 will operate to manipulate the right side of bed and mattress structure 50.

Typically when the user operates bed and mattress structure 50 including articulating deck 138 and four-zone air bladder 96 using illustrative key pad 318 shown in FIG. 22, the user will press one of memory buttons 322. However, on occasion, the user may choose to adjust the position of articulating deck 138 using bed position buttons 324 and may probably less frequently, wish to adjust the support and firmness characteristics of mattress 52 by pressing mattress control buttons 326. Occasionally, the typical user will utilize the massage feature by pressing massage control buttons 328.

Thus, illustrative key pad 318 is arranged so that buttons are ordered from first end 310 to second end 312, or from top to bottom, in order of the frequency of use of the buttons so that the most frequently used buttons are positioned to lie nearest the top or first end 310 of keypad 318 and the least frequently used buttons are nearest the bottom or second end 312 of key pad 318. In addition, it can also be seen that illustrative key pad 318 is arranged so that buttons are ordered from first end 310 to second end 312, or from top to bottom of key pad 318, generally in the order that the user will use the buttons so that the first buttons generally used in a typical operation sequence are nearest the top of key pad 318 and the last buttons used in a typical operation sequence are nearest the bottom of key pad 318.

Figure 23:
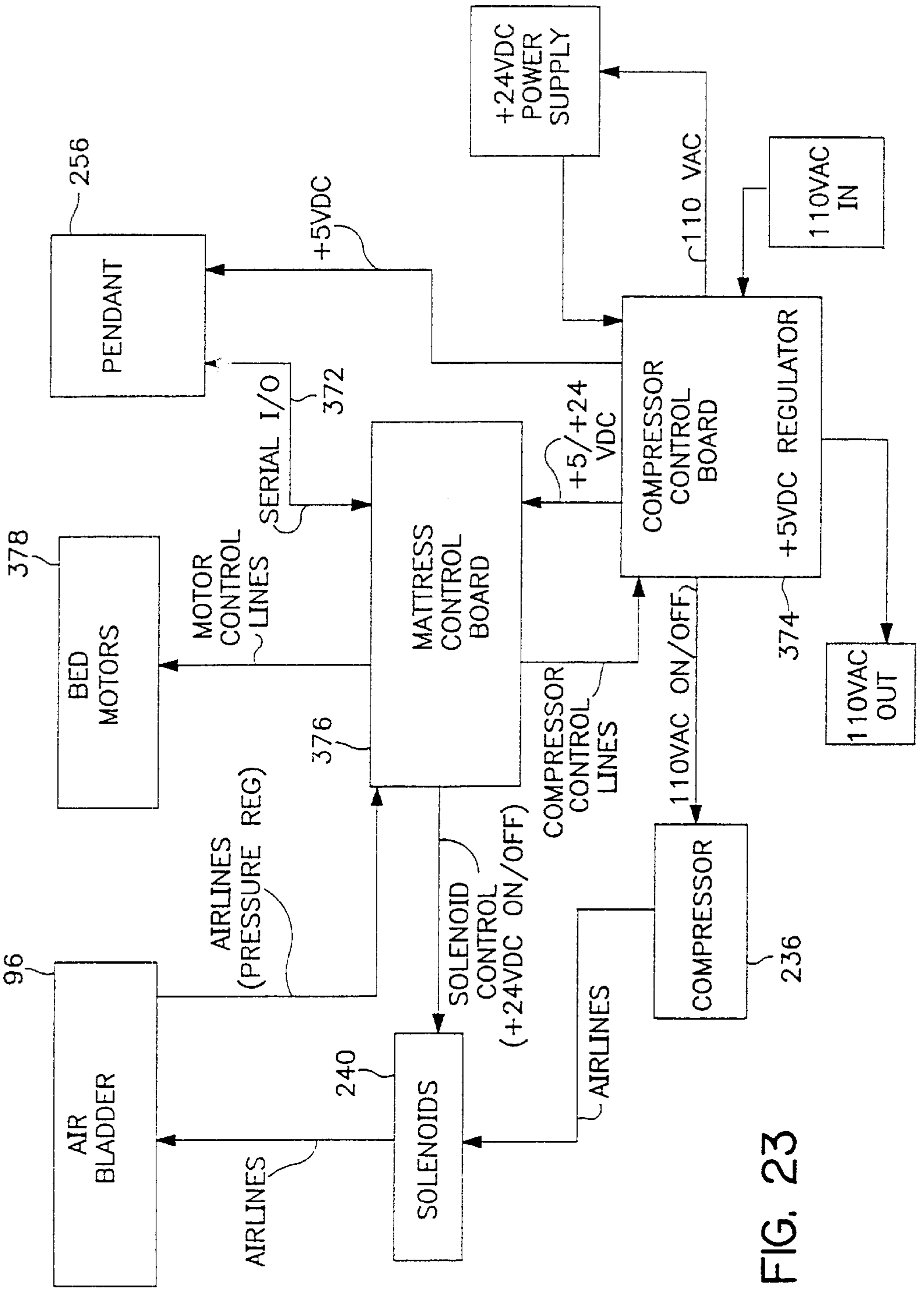
FIG. 23 is a schematic block diagram illustrating the electrical components of a control system for controlling features of the bed and mattress structure in accordance with the present invention.
Figure 24A:
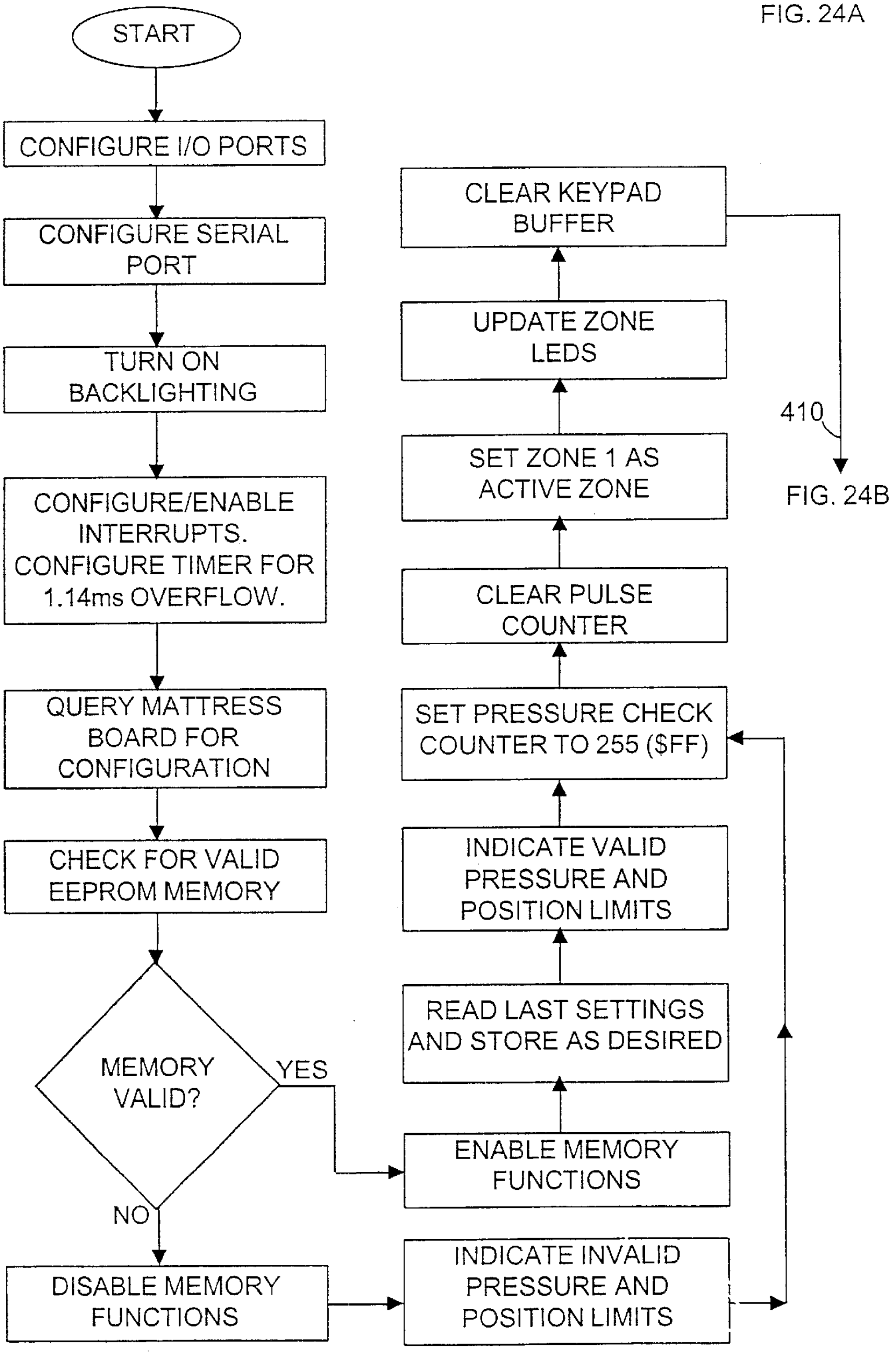
FIGS. 24A–24L are flow charts illustrating steps performed by the control system for manipulating the bed and mattress structure in response to inputs made by the user by way of the hand held controller.
Figure 24B:
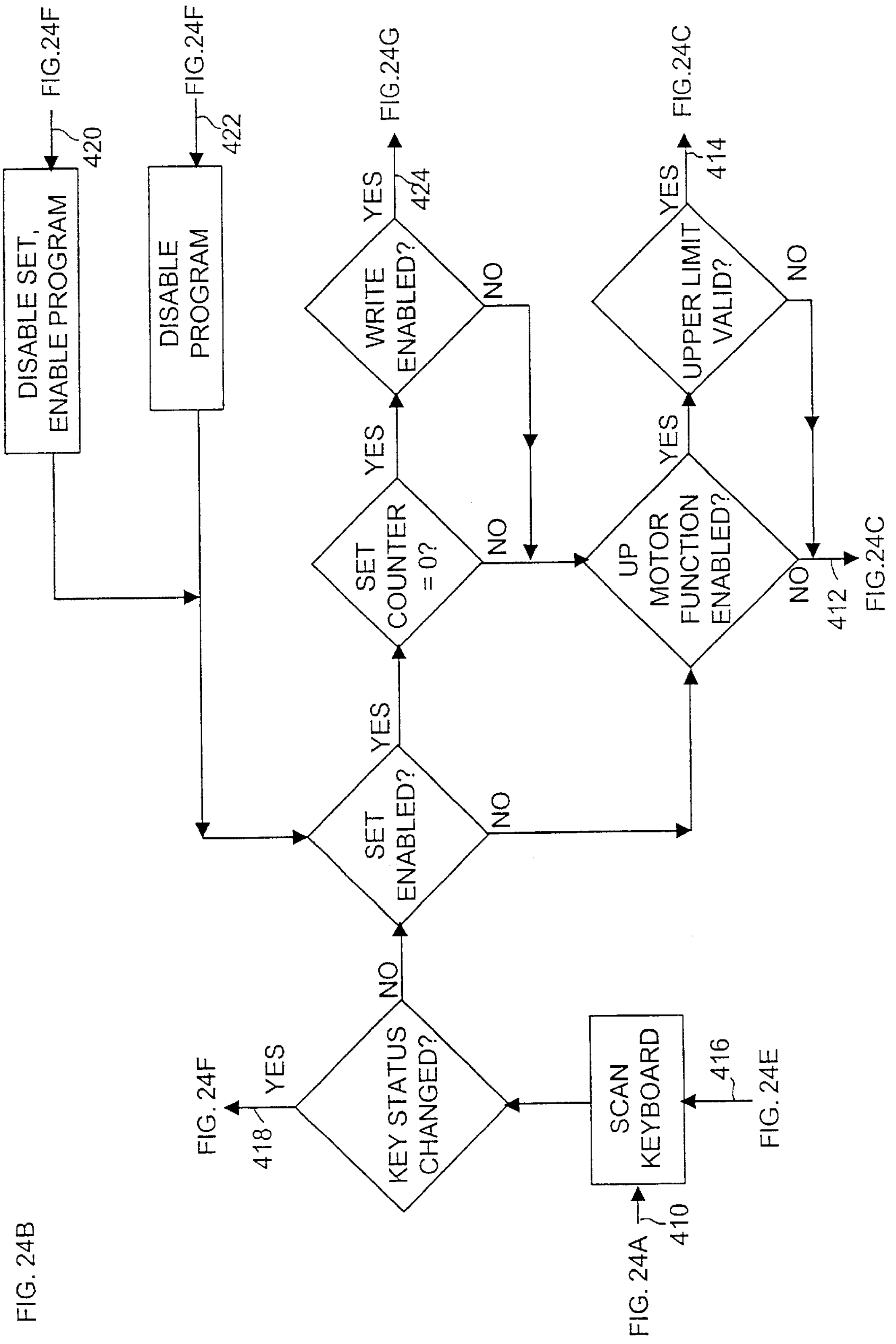
Figure 24C:
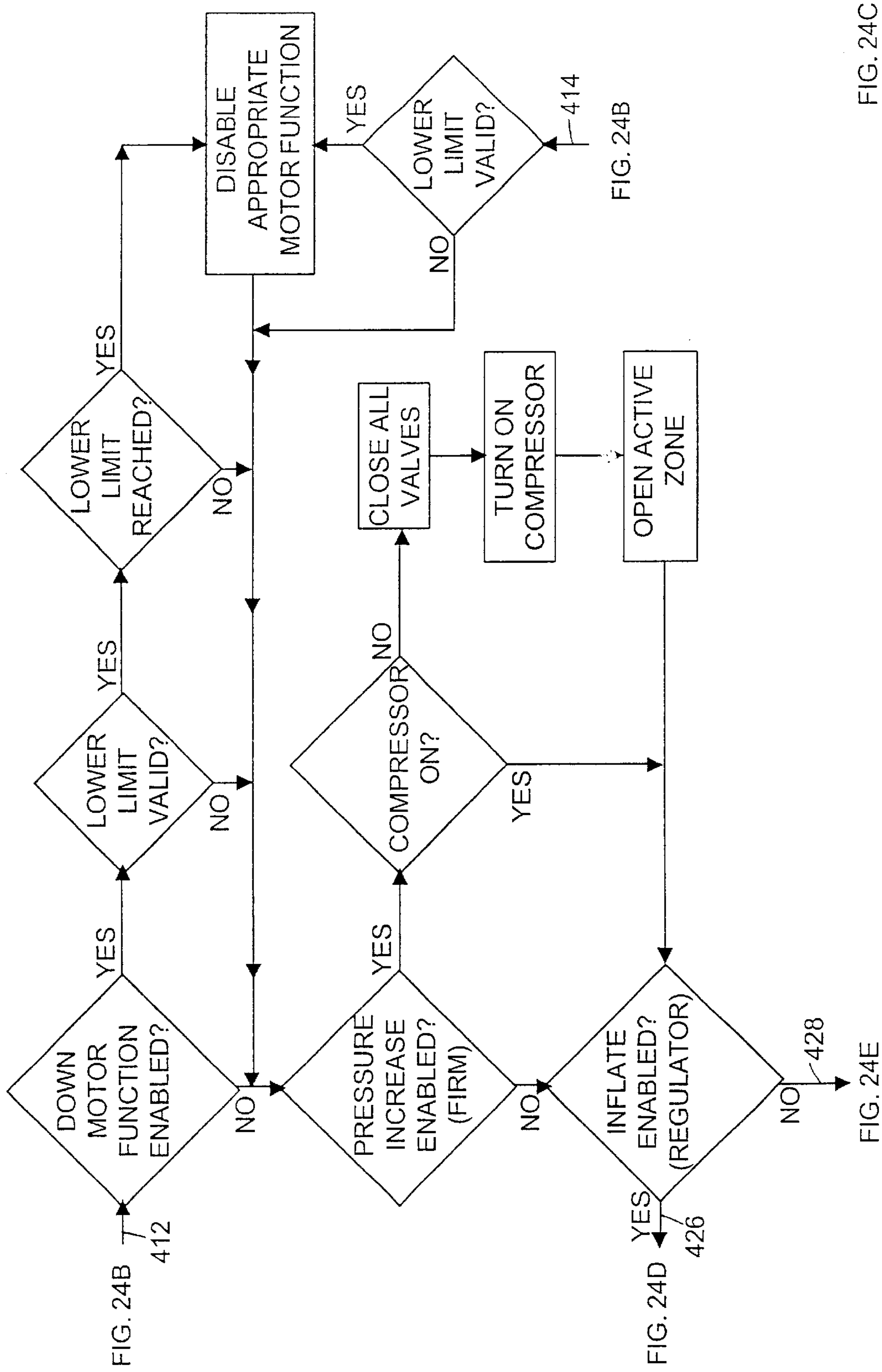
Figure 24D:
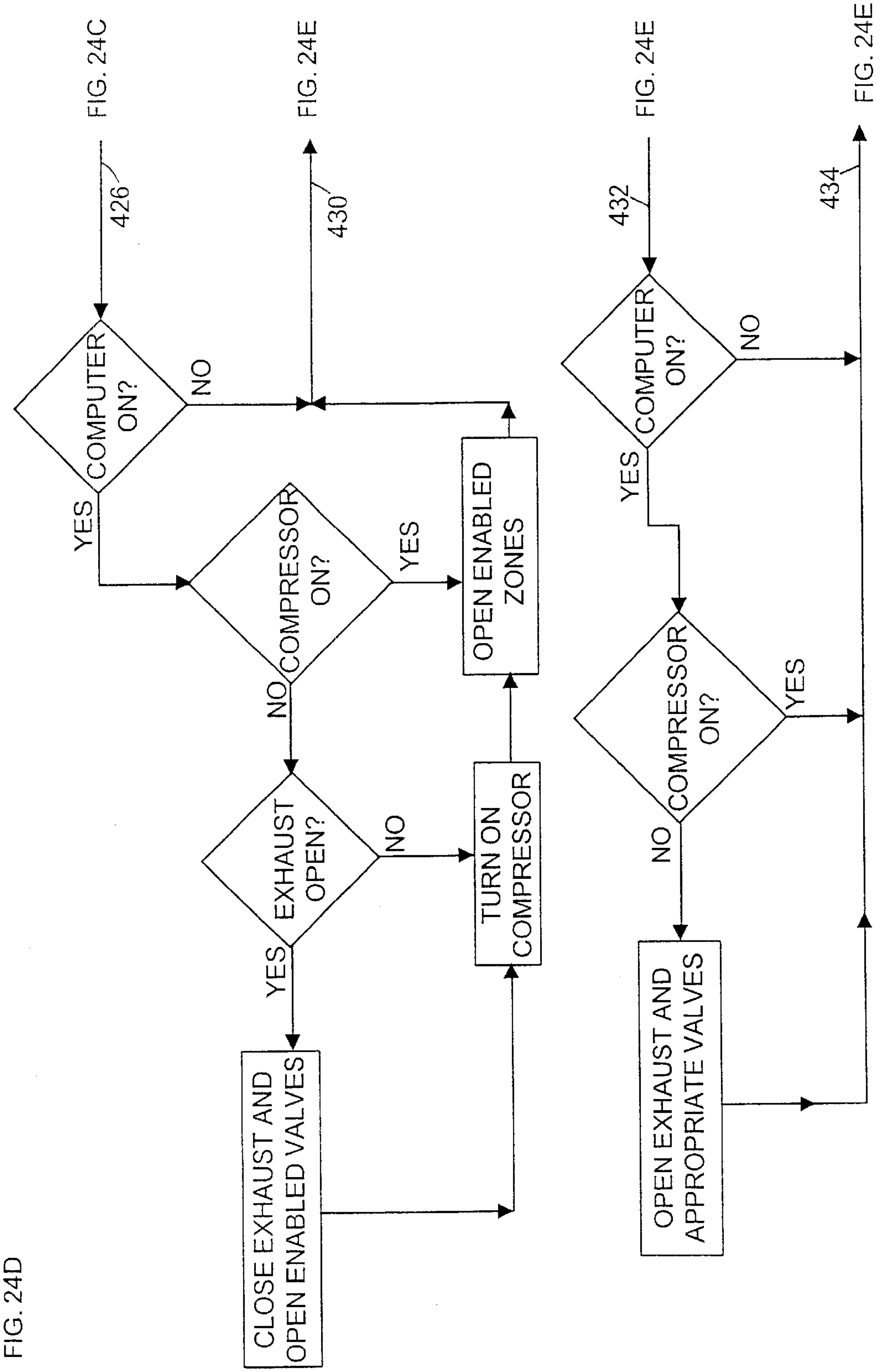
Figure 24E:
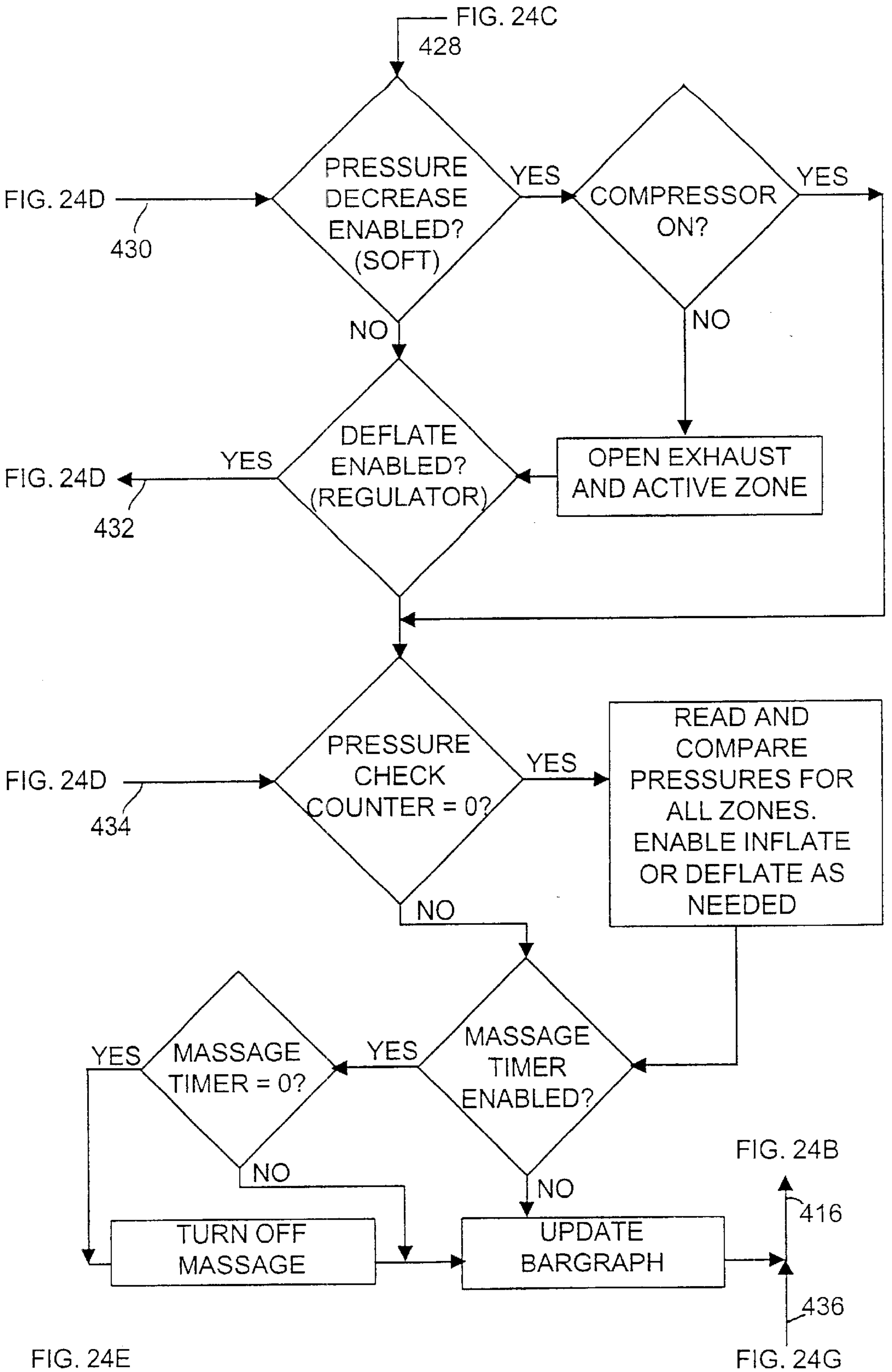
Figure 24F:
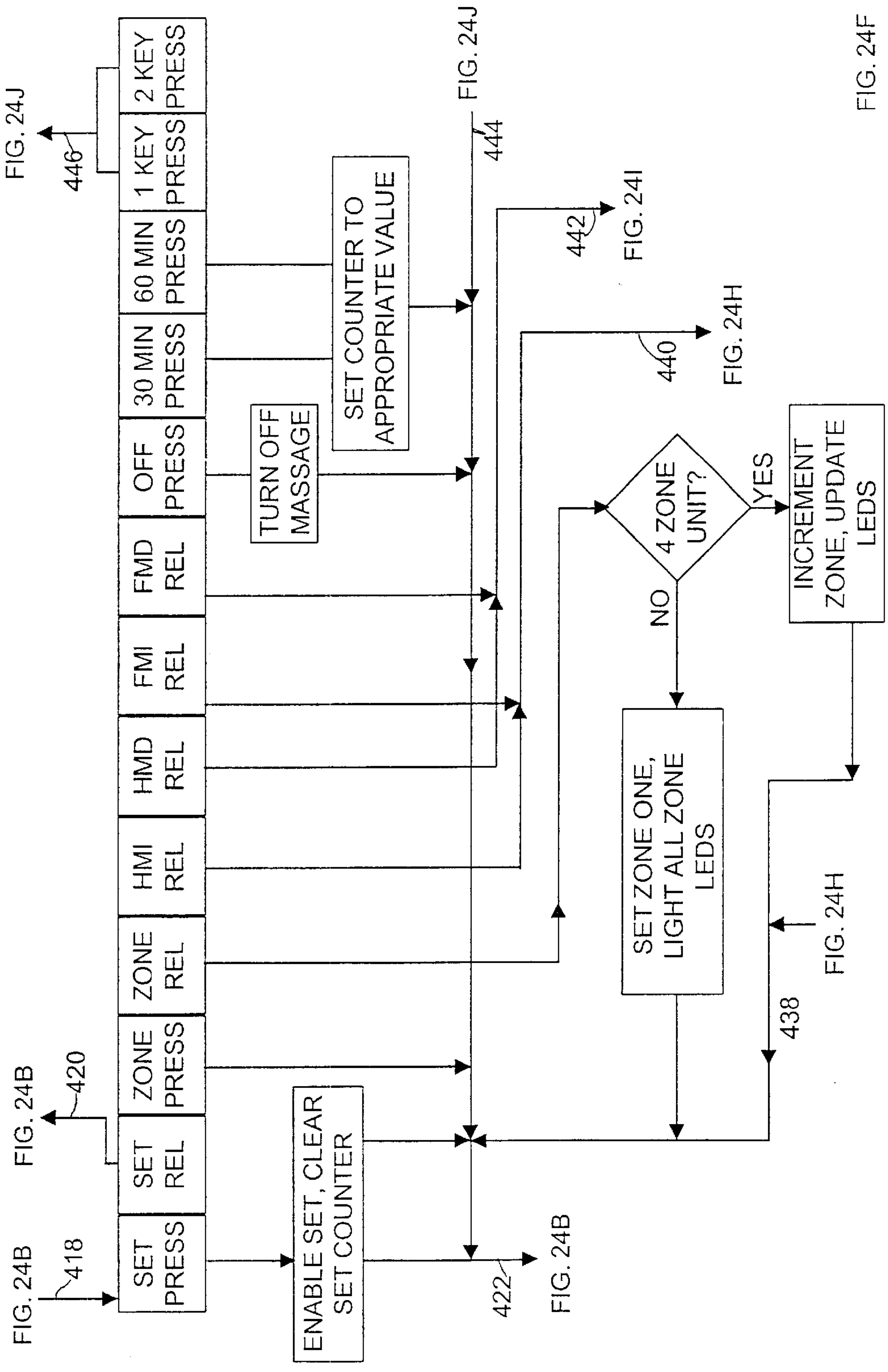
Figure 24G:
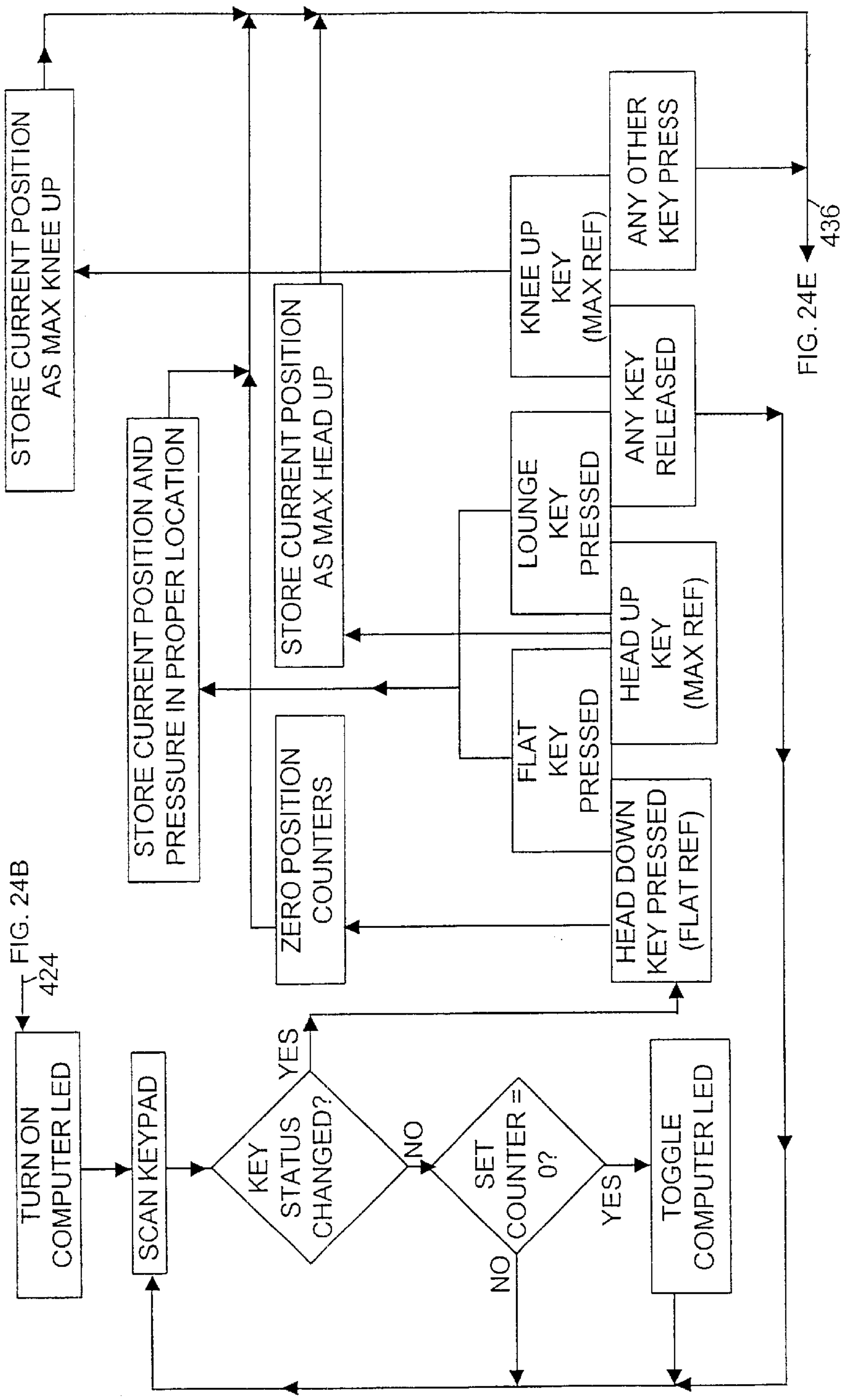
Figure 24H:
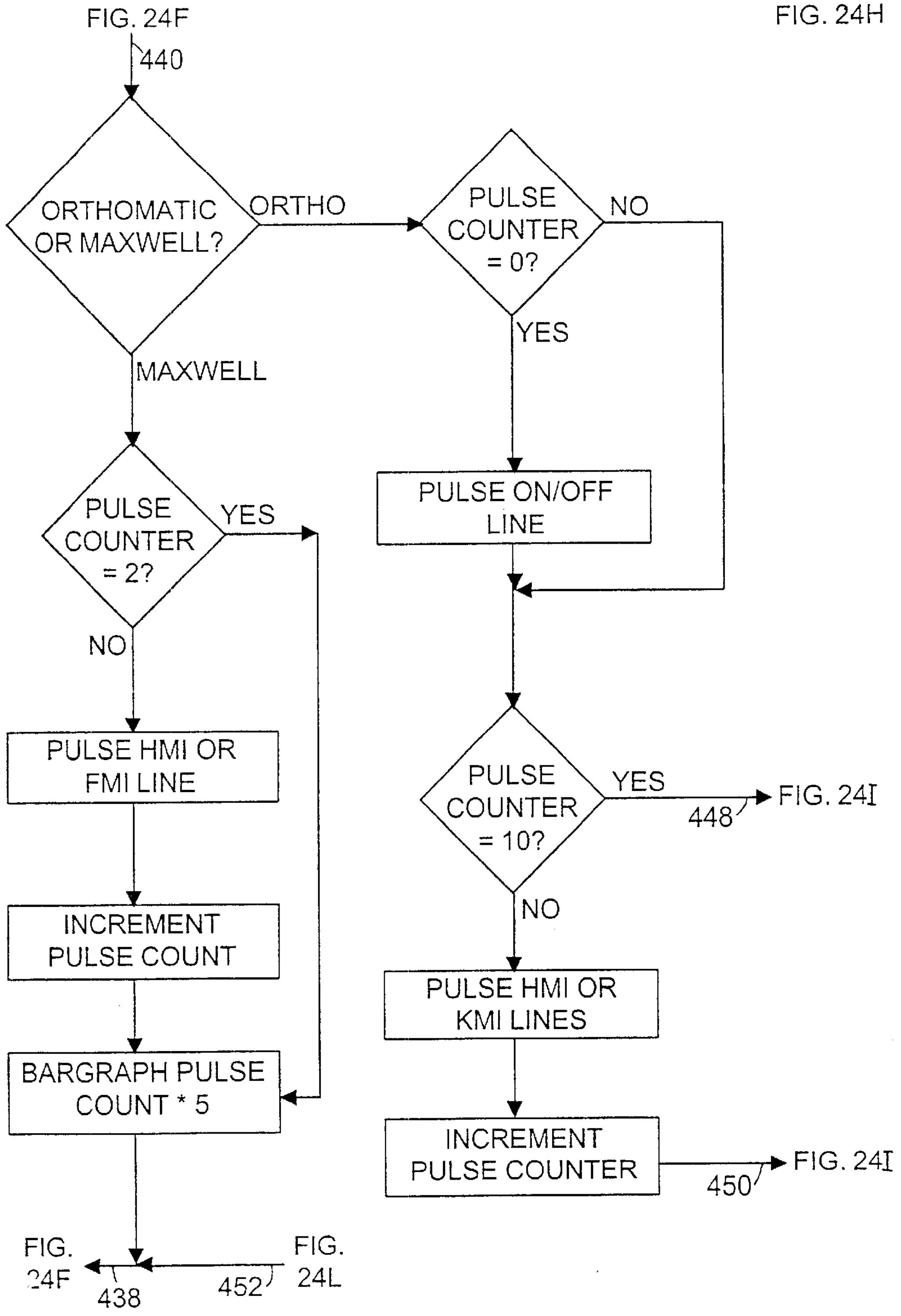
Figure 24I:
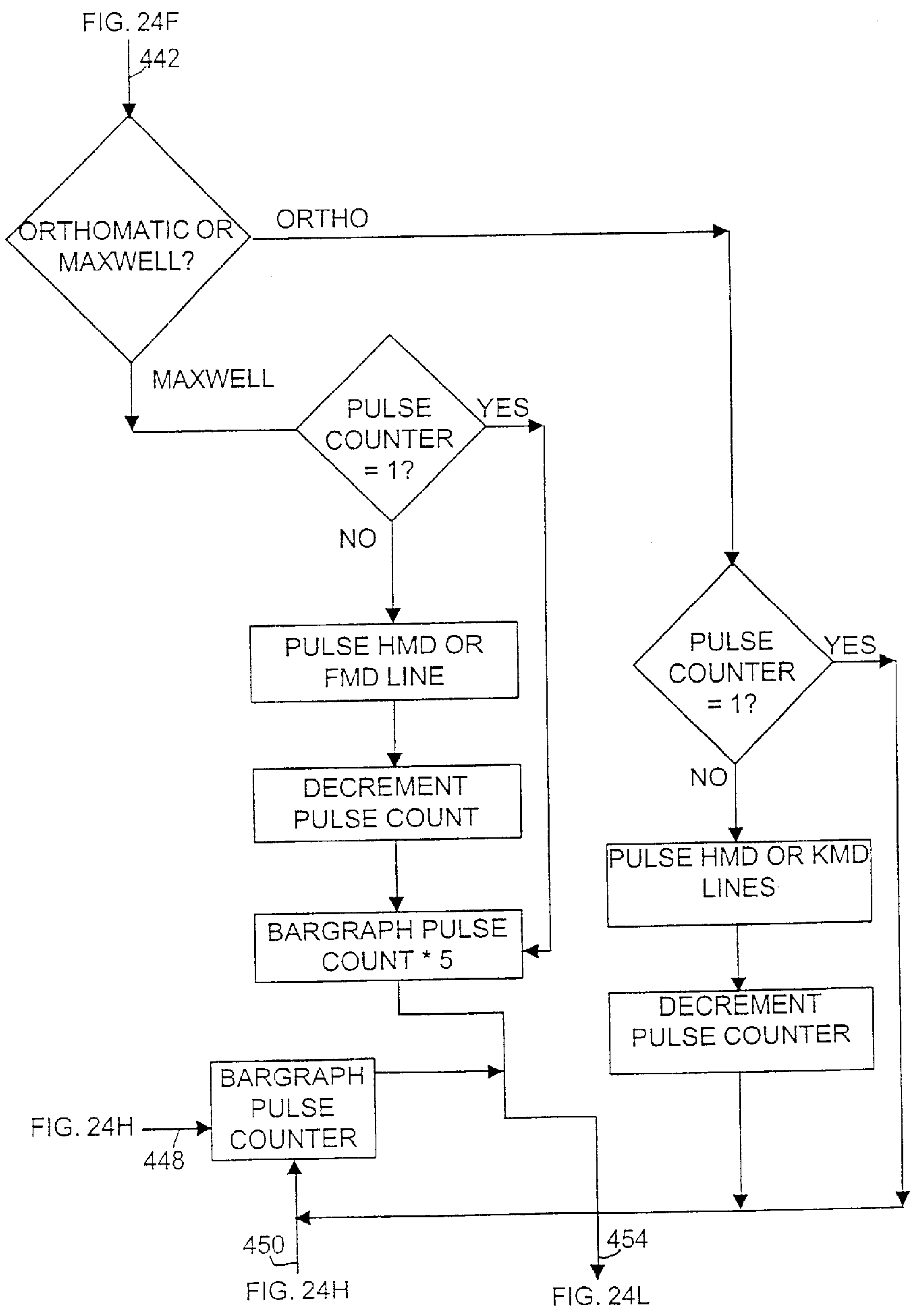
Figure 24J:
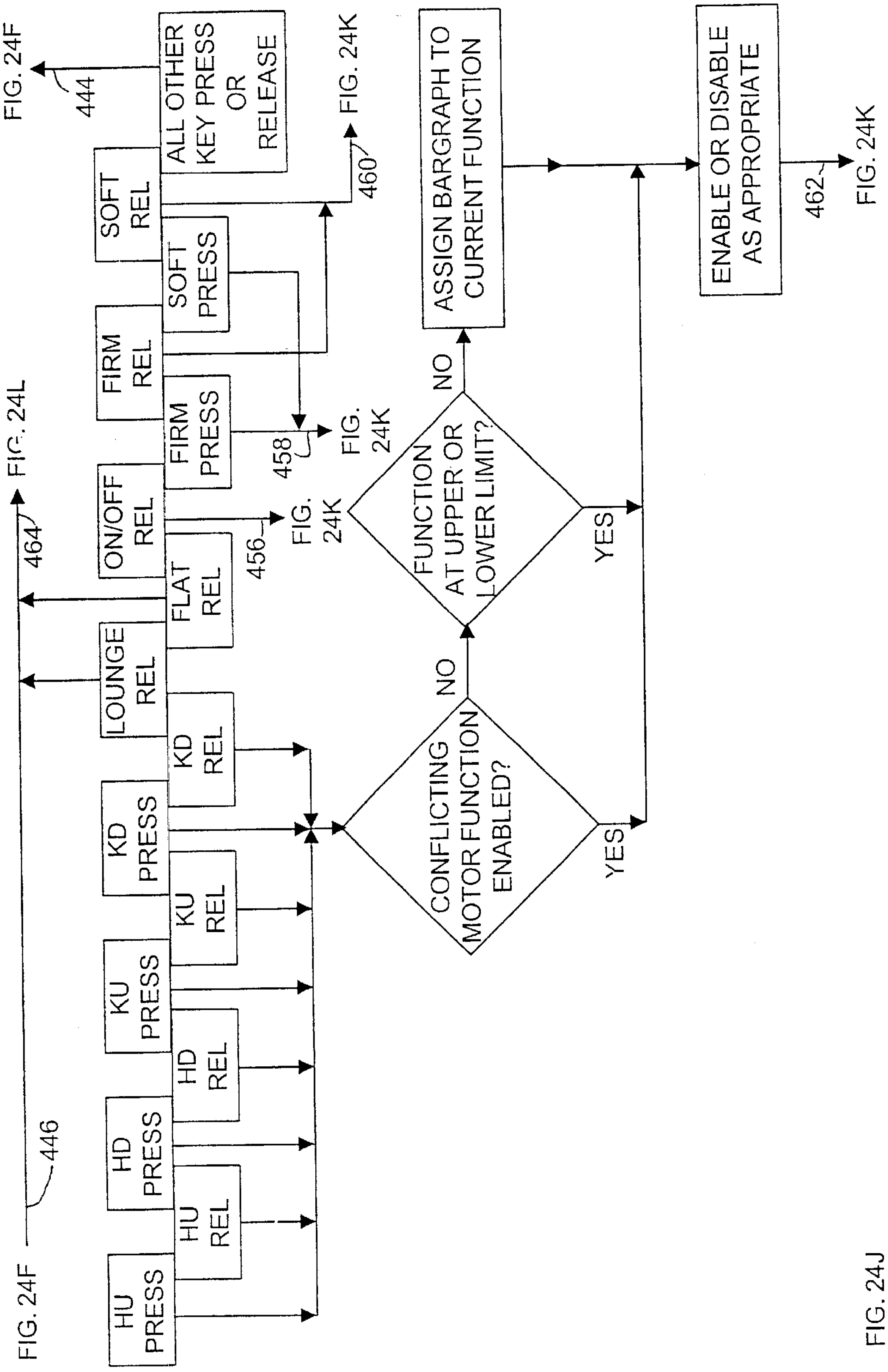
Figure 24K:
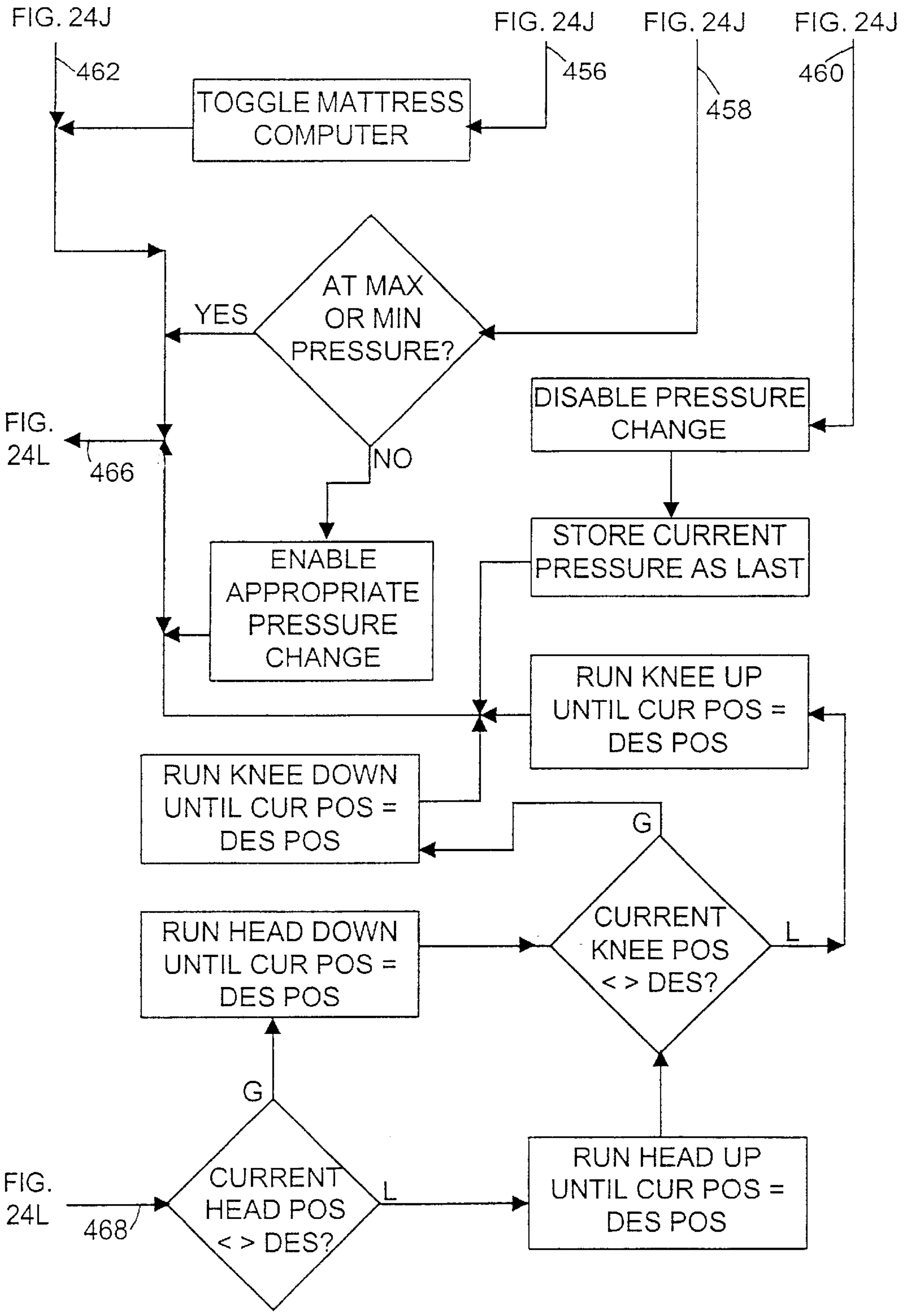
Figure 24L:
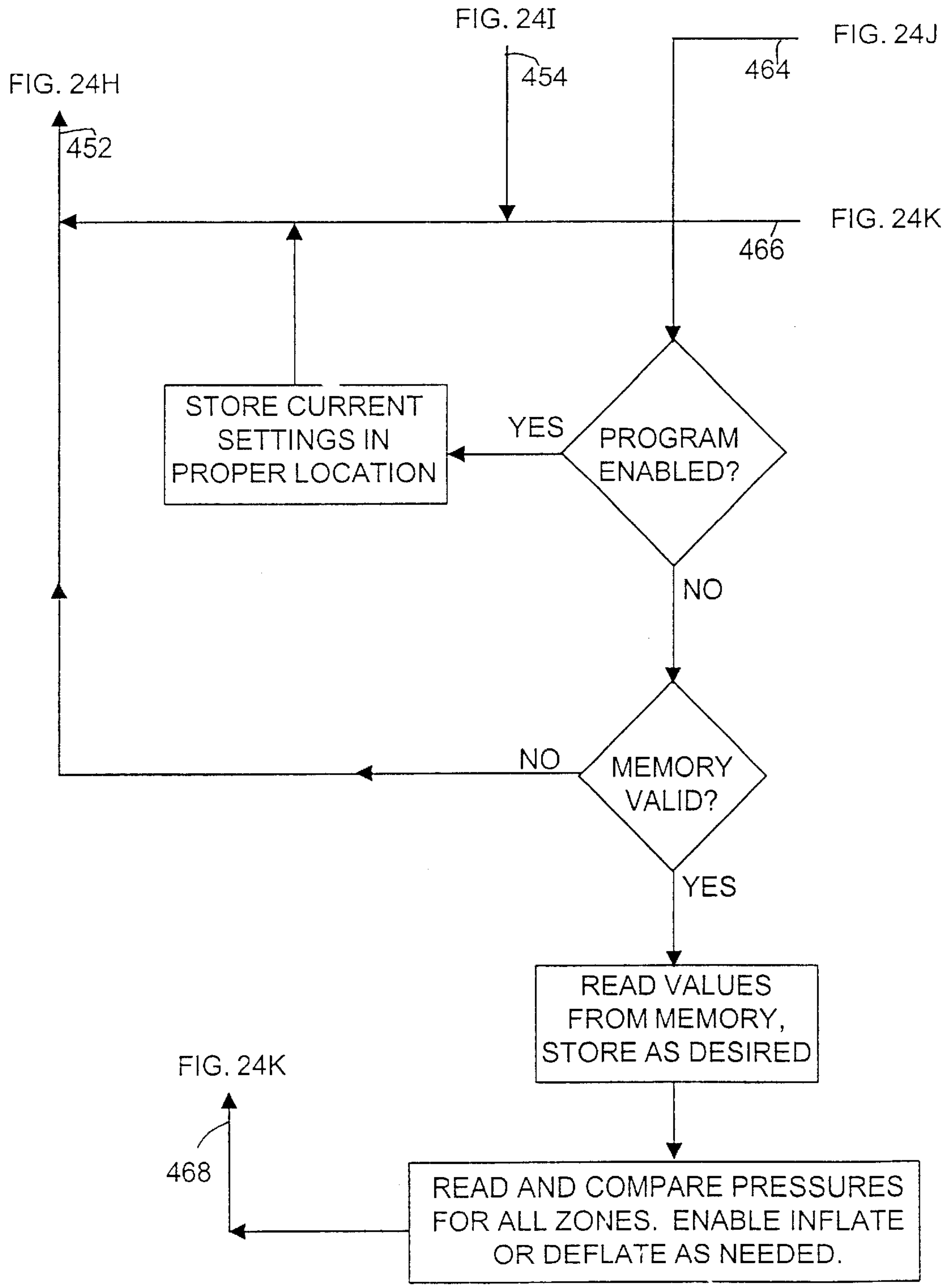

Hand held controller 256 provides the man-machine interface for the user. By depressing buttons 322, 324, 326, 328, 330 (graphically displayed) the user can select various operations. These operations are bed position, mattress computer, memory, massage, mattress zones, and firm or soft controls. These commands are sent by way of an RS232 wire connection 372 to the compressor board 374 as shown in FIG. 23. The compressor board 374 acts as an interconnection interface to the mattress control board 376, massage and bed position motors 378. Signals generated at hand held controller 256 pass through compressor board 374 to mattress control board 376. Mattress controller operates valves 240 to control the flow of compressed air or exhaust from zone to zone. Mattress controller also receives signals from transducers 296 that monitor the air pressure at each zone and provides signals back to hand held controller 256 for display.

Hand held controller 256 is a microprocessor based control system capable of remotely controlling up to eight bladders or individual air zones of air bladders 96 via a serial link with pressure control system. The system will also receive and display relative pressure information by way of the serial link. The link itself is to be either a wire or a wireless link.

The system is based on a Microchip 16 C series surface mount one time programmable device. There are two microcontrollers used. One located in hand held controller 256 and the other is in mattress control board. They communicate VIA an RS232 serial link.

The primary benefit of the Microchip device is the implementation of control algorithms due to the controller's reduced instruction set. Additional benefits include:

- Simplified memory requirement predictions, and timing calculations due to the single line, predominantly single cycle instructions.
- Low Cost.
- No additional program memory required.
- Software is directly portable to other devices in the large family allowing for easier upgrades.
- Specialized sleep capability, and external interrupts allow a power consumption savings.
- Built in, independent watch dog timer prevents system crash due to an unresponsive controller.
- Separate program and data memory prevents unintentional program corruption due to accidental program memory access.

A salient feature for this system is the implementation of a direct feed back display on key pad 318 at the man-machine interface. Primary display 320 presents the user with direct real time feed back of control operations. Mattress control board 376 receives signals from transducers 296 in response to the air pressure in each zone and uses that information to display pressure setting and the controlled zones of air bladder 96 on primary display 320 of hand held controller 256.

Mattress 52 is ideally suited for providing a user with sleeping surface 122 that is customized to provide firmness and support characteristics established by and for the user. As described above, mattress 52 can include air bladder 96 having either one zone or multiple zones, and within each zone air bladder 96 can be provided with I-beams of varying height to provide multiple firmness and support characteristics within each zone. Mattress 52 can also include sculptured foam core 94 or zone foam blocks 92 as described above. In addition, however, mattress 52 may be provided with combinations of the above as shown in FIGS. 1(*b*) and 1(*c*).

Mattress 52 can be provided with a combination of zone foam blocks 92 and air bladders 96 as shown in FIG. 1(*b*) which illustratively shows air bladders 96 for supporting the scapula and sacrum of the user and zone foam blocks 92 for supporting the lumbar region and the thighs and legs of the user. Air bladders 96 can operate individually and separately, or air bladders 96 can be brought into fluid communication with one another in a manner similar to that described above with respect to FIG. 8(*b*) so that they inflate and deflate generally at the same time and to generally the same extent.

Likewise, mattress 52 can illustratively include zone foam blocks 92 positioned to support the upper back, the seat, and the lower legs of the user and air bladders 96 to support the lumbar region and thighs of the user as shown in FIG. 1(*c*). As mentioned above, air bladders 96 can operate individually and separately, or air bladders 96 can be brought into fluid communication with one another in a manner similar to that described above with respect to FIG. 8(*b*) so that they inflate and deflate generally at the same time and to generally the same extent. As can be seen, any combination or positioning of zone foam blocks 92 and air bladders 96 can be provided in mattress 52 to meet the desired firmness and support characteristics of the user. Although preferred sculptured foam core 94 generally extends the full length of central opening 82, shorter sculptured foam cores (not shown) can be provided for use in combination with air bladders 96 and zone foam blocks 92 if desired to provide the user with his or her preferred firmness and support characteristics without exceeding the scope of the invention as presently perceived.

Mattress 52 along with a "test mattress" (not shown) containing a multiple zone air bladder 96 can be used to determine the firmness, support, and interface pressure preferences of the user and to use the same to customize mattress 52 for each user. The preferred method for customizing mattress 52 is initiated when a potential user completes a questionnaire to aid in the analysis of that user's "sleep profile." The sleep profile assesses such factors as the user's general health and sleep habits. A firmness recommendation is computed either in terms of a pressure for various zones of the test mattress or in terms of a foam type and density for each zone. In addition, a surface recommendation is established based on the user's responses to a surface recommendation questionnaire.

Once the surface and hardness recommendations are established, the user lies on the test mattress and air bladder 96 is pressurized to match the firmness recommendation. Zones of air bladder 96 are then adjusted to match the preferences of the user and the resulting preferred firmness readings are recorded.

An algorithm has been developed that correlates the air bladder pressure readings once the preferred firmness and support characteristics have been established by the user into a customized bed configuration. For example, the preferred firmness readings can be translated to establish the foam density that, if incorporated into a mattress will provide the firmness and support characteristics similar to those provided by the test sleeping surface having the preferred firmness readings.

This correlation can be developed by comparing the deformation of air bladder 96 having a selected air pressure when a known force is applied thereto by a probe of a known size, and then determining a foam ILD that provides the same deflection when the same force is applied to the foam by the same probe. A pressure deformation response curve can be developed that shows the foam ILD that provides generally the same deflection as air bladder 96 for various air pressures within bladder 96.

Once the air pressure readings have been found that provide the user with his or her preferred firmness, support, and interface pressure characteristics, mattress 52 can be prepared using the pressure deformation response curve so that mattress 52 has mattress structure components or cores 88 including sculptured foam core 94, zone foam blocks 92, air bladder 96, or a combination thereof that provide the user with the preferred characteristics. In addition, if desired, a computer can be used to map the pressure readings of the test mattress. After finding the user's preferred firmness and support characteristics and a program can utilize the pressure map and the pressure deformation response curve to determine the arrangement of mattress structure components that will provide mattress 52 that meets the user's preferences.

Once the customized bed configuration is established, mattress 52 can be assembled from a kit at the point of sale containing the plurality of cores 88 for the user to test and verify that assembled mattress 52 meets his or her preferences. If mattress 52 is not satisfactory, cores 88 can be replaced at the point of sale. Once the user is satisfied with the arrangement of cores 88, he or she can immediately take delivery of the completed customized mattress if desired. In the alternative, once the customized bed configuration is established, the data describing this configuration can be transmitted to a factory at which the mattress 52 can be assembled for delivery to the user.

In addition, if the user determines after assembly and delivery that the user prefers alternate firmness or support characteristics, cores 88 can again be readjusted or upgraded until the mattress 52 provides the desired firmness and support characteristics. If desired, a kit of cores 88 can be provided to the user so that the user can adjust the firmness and support characteristics.

The method for selecting mattress structure components or cores 88 to provide a customized foam mattress 52 to accommodate the musculoskeletal condition of the user includes providing a plurality of mattress structure components arranged for selective assembly of the components. The components comprise a plurality of foam cores 88 for filling longitudinally extending central opening 82 in mattress 52 above which the user rests. Foam cores 88 should have a variety of shapes and support and firmness characteristics from which to select a desired assembly.

The method also includes providing a test mattress having a similar longitudinally extending central opening filled with a plurality of longitudinally spaced apart air bladders extending transversely across the central opening and an air supply for selectively filling each air bladder to various pressures. A user is placed above the central opening of the test mattress and supported on the plurality of air bladders. The air pressure in each bladder is adjusted to a selected pressure to provide the support and firmness desired by the user. An equivalent foam core having the desired support and firmness characteristics corresponding to the selected air pressures is then selected and placed in the central opening to provide the customized mattress.

In preferred embodiments, the mattress 52 in accordance with the present invention can be sized for a twin bed or a double bed as shown in FIGS. 1(*a*)–1(*c*), or a queen-sized or a king-sized bed as shown in FIG. 2. When mattress. 52 is sized for the queen and king-sized beds, both sides of mattress 52 can be individually customized if desired to provide the firmness and support characteristics desired by individual sleep partners. Both cores 88 and toppers 86 can be selected for each side of mattress 52 to provide the desired firmness and support for each side of the bed. This flexibility results from the separate cores 88 that are provided for each side of mattress 52.

In addition to this flexibility, use of distinct cores 88 for each half of mattress 52 operates to reduce the transmission of movement from one side of mattress 52 to the other. Thus, when one sleeping partners moves, the amount of movement experienced by the other sleeping partner as a result is minimized.

As mentioned above, mattress 52 can be provided with an air bladder having independent zones that are selectively adjustable by the user to provide varied firmness and support characteristics. If the same mattress 52 is used on a bed having articulating deck 138, mattress 52 can be provided with hand held controller 256 for use by the user to control the adjustment of both the position of deck 138 and the support characteristics of each zone of air bladder 96. In addition, hand held controller 256 can include a "memory set" feature which allows the user to establish preferred combination settings for deck 138 and mattress 52.

In addition, the mattress can be provided with combinations of air bladders 96, zone foam elements 92, and sculptured foam core 94 to produce a "combination mattress." Illustratively, mattress 52 can be provided having air bladder 96 supporting the scapula of the user, zone foam blocks 92 supporting the lumbar of the user, air bladder 96 in the seat portion supporting the sacrum of the user, and zone foam blocks 92 supporting the thighs and legs. If desired, air bladders 96 can be in fluid communication so that they inflate and deflate at the same times and to the same pressures or air bladders 96 can be independent of one another and independently controlled by the user so that the user can establish different characteristics of support and firmness for each of the scapula and the sacrum.

Although the invention has been described in detail with reference to preferred embodiments, additional variations and modifications exist within the scope and spirit of the invention as described and defined in the following claims.

What is claimed is:

1. A control system for a variable firmness mattress structure comprising a plurality of longitudinally spaced apart, transversely extending air bladders and an air supply for filling each bladder to a respective desired air pressure to support a user at a desired mattress firmness, the control system comprising:

an air controller cooperating with the air supply for filling the air bladders to desired air pressures; and a hand-held controller in communication with the air controller, the hand-held controller being configured to receive a first input from the user indicating that a first desired mattress firmness currently exists and to transmit to the air controller a first signal corresponding to the first input, wherein the first desired mattress firmness corresponds to a first set of respective desired air pressures in the bladders, and being further configured to receive a second input from the user indicating a desire to restore the first desired mattress firmness and to transmit to the air controller a second signal corresponding to the second input;

wherein the air controller responds to the second signal by restoring the first set of respective desired air pressures in the bladders.

2. The control system of claim 1, wherein the air controller includes a microprocessor and software in communication with the hand-held controller for storing data representative of the first set of respective desired air pressures in the bladders, and controlling the air controller to establish the first set of respective desired air pressures in the bladders in response to receiving the second signal from the hand-held controller.

3. The control system of claim 1, in which the hand-held controller includes a key pad having a first end and a second end, the first end being positioned generally above the second end when held by the user, the key pad including buttons arranged having the most frequently selected buttons positioned near the first end, the least frequently selected buttons positioned near the second end, and the remaining buttons positioned therebetween in the order of frequency of use with the most frequently used buttons positioned nearest the first end.

4. The control system of claim 1, in which the hand-held controller includes a key pad having a first end and a second end, the first end being positioned generally above the second end when held by the user, the key pad including buttons arranged in the order that the user generally will use the buttons in a typical operation sequence, the first buttons generally used in the typical operation sequence being positioned nearest the first end and the last buttons generally used in the typical operation sequence being positioned nearest the second end.

5. The control system of claim 1, further comprising a frame configured to support the mattress, the frame including longitudinally spaced head, seat, thigh, and foot sections, the head, thigh, and foot sections being movable relative to each other and relative to the seat section and further comprising a drive controller for tilting the frame sections to various desired positions.

6. The control system of claim 5, wherein the hand-held controller is further configured to receive drive memory set inputs from the user to permit the user to establish at least one user preferred position setting of the frame sections, and to transmit to the drive controller at least one drive memory recall input from the user representing the user preferred position setting, the drive controller tilting the frame sections to the at least one user preferred position setting in response to the drive memory recall input.

7. The control system of claim 6, wherein the drive controller includes microprocessor and software in communication with the hand-held controller for storing at least one drive memory set input received from the hand-held controller, and controlling the drive controller to establish desired frame section positions in response to receiving the at least one drive memory recall input from the hand-held controller.

8. A control system for a variable firmness mattress structure comprising a plurality of longitudinally spaced apart, transversely extending air bladders and an air supply for filling each bladder to desired air pressures to support a user at a desired mattress firmness, the control system comprising:

an air controller cooperating with the air supply for filling the air bladders to desired air pressures;

a hand-held controller in communication with the air controller, the hand-held controller including a key pad having a first end and a second end, the first end being positioned generally above the second end when held by the user, the key pad including air adjustment buttons, at least one memory set button to permit the user to establish at least one user preferred air-firmness setting in the air bladders, and at least one memory recall button to permit the user to transmit to the air controller at least one air memory recall input from the user representing the user preferred air-firmness setting; and the air controller filling the air bladders to the at least one user preferred air-firmness setting in response to the user activating the at least one memory recall button.

9. The control system of claim 8, wherein the at least one memory set button is positioned to lie adjacent the first end of the key pad.

10. The control system of claim 9, wherein the at least one memory recall button is positioned to lie adjacent the at least one memory set button.

11. The control system of claim 9, wherein the air adjustment buttons are positioned to lie between the at least one memory recall button and the second end of the key pad.

12. The control system of claim 8, wherein the air controller includes microprocessor and software in communication with the hand-held controller for storing at least one air memory set input received from the hand-held controller upon activation of the at least one memory set button, and controlling the air controller to establish desired bladder pressures in response to activation of the at least one memory recall button.

13. The control system of claim 8, wherein the frame includes longitudinally spaced head, seat, thigh, and foot sections, the head, thigh, and foot sections being movable relative to each other and relative to the seat section and further comprising a drive controller for tilting the frame sections to various desired positions.

14. The control system of claim 13, wherein the drive controller includes microprocessor and software in communication with the hand-held controller for storing at least one drive memory set input received from the hand-held controller upon activation of the at least one memory set button, and controlling the drive controller to establish desired frame section positions in response to activation of the at least one memory recall button.

15. The control system of claim 14, wherein the air controller includes microprocessor and software in communication with the hand-held controller for storing at least one air memory set input received from the hand-held controller upon activation of the at least one memory set button, and controlling the air controller to establish desired bladder pressures in response to activation of the at least one memory recall button.

16. A control system for a bed and a variable firmness mattress structure for use by a user, the bed and mattress structure including a mattress having at least one air bladder, a pressure regulator measuring the air pressure in the at least one bladder and providing a pressure signal in response thereto, an air supply, an inlet valve interposed between the air supply and the bladder, and an exhaust valve, the control system comprising:

a mattress control board operatively coupled to the pressure regulator, the inlet valve, and the exhaust valve, and a controller operatively coupled to the mattress control board and configured to receive user inputs and to relay the user inputs to the mattress control board, the mattress control board being configured to operate the inlet valve and the exhaust valve in response to user inputs to vary the firmness in the mattress, the controller including a memory recall button and providing a memory recall signal when the memory recall button is pressed, the mattress control board operating one of the inlet valve and the exhaust valve in response to the memory recall signal and the pressure signal so that the pressure in the bladder provides firmness and support characteristics pre-selected by the user.

17. A variable firmness mattress structure for use by a user, the mattress structure comprising:

a bladder configured to contain air at a pressure, and a pressure control system including a pressure regulator measuring the air pressure in the bladder and providing a pressure signal in response thereto, an air supply in fluid communication with the bladder, an inlet valve interposed between the air supply and the bladder, an exhaust line in fluid communication with the bladder, an exhaust valve interposed between the bladder and the exhaust line, a controller receiving inputs from the user and providing user signals in response thereto, and a mattress control board operatively coupled to the inlet valve, the exhaust valve, the pressure regulator, and the controller, the mattress control board receiving the pressure signal and the user signals and providing operation signals to the inlet valve and the exhaust valve in response thereto so that the air pressure in the mattress is manually increased or decreased in response to the inputs from the user to vary the firmness in the mattress, the mattress control board further comprising a memory device and receiving a memory set signal from the controller when the pressure in the bladder is at a preferred pressure selected by the user, the memory device storing a memory code corresponding to the memory set signal, the controller further comprising a memory recall button providing a memory recall signal to the mattress control board when the memory recall button is activated, the mattress control board providing operation signals to one of the inlet valve and the exhaust valve in response to the memory recall signal and the memory code to automatically adjust the air pressure in the bladder to the preferred pressure selected by the user.

18. A bed and variable firmness mattress structure comprising:

a frame including a seat section and a head section that is movable relative to the seat section of the frame, a mattress carried by the frame, the mattress including a bladder, means for selecting a preferred position of the head section relative to the seat section and for selecting a preferred pressure of air in the bladder at which the bladder provides selected firmness and support characteristics when the head section is in the preferred position, means for manually adjusting the pressure of the air in the bladder to vary the firmness in the mattress, means for manually adjusting the position of the head section relative to the seat section, and means for automatically adjusting the head section to the preferred position and for automatically adjusting the pressure in the bladder to the preferred pressure.

19. A bed and variable firmness mattress structure for use by a user providing user inputs, the bed and mattress structure comprising:

an articulating deck including a head section that is movable relative to a seat section, a mattress including a bladder containing air at a pressure, a controller configured to receive user inputs and provide user position signals and user pressure signals in response thereto, a deck control system configured to position the head section relative to the seat section in response to the user position signal, and a bladder control system configured to adjust the pressure of air in the bladder in response to the user pressure signal to vary the firmness in the mattress, the controller including:

a bed position button, the controller providing user position signals when the bed position button is activated to manually manipulate the position of the head section relative to the seat section, a mattress control button, the controller providing user pressure signals when the mattress control button is activated to manually manipulate the pressure of air in the bladder, and a memory button and a set button, the controller providing a memory code in response to activation of both of the memory button and the set button corresponding to a user selected position of the articulating deck and a user selected pressure of air in the bladder, the controller providing a memory signal when the memory button is activated to automatically move the articulating deck to the user selected position and automatically adjust the pressure of air in the bladder to the user selected pressure of air in the bladder.

* * * * *